US008447963B2

(12) United States Patent
Kraus et al.

(10) Patent No.: US 8,447,963 B2
(45) Date of Patent: May 21, 2013

(54) METHOD AND SYSTEM FOR SIMPLIFYING DISTRIBUTED SERVER MANAGEMENT

(75) Inventors: Thomas Martin Kraus, Natick, MA (US); Vijay G. Manwani, Needham, MA (US); Sekhar Muddana, South Attleboro, MA (US)

(73) Assignee: BladeLogic Inc., Houston, TX (US)

( * ) Notice: Subject to any disclaimer, the term of this patent is extended or adjusted under 35 U.S.C. 154(b) by 1929 days.

(21) Appl. No.: 10/414,959

(22) Filed: Apr. 16, 2003

(65) Prior Publication Data
US 2003/0233571 A1  Dec. 18, 2003

Related U.S. Application Data

(60) Provisional application No. 60/388,112, filed on Jun. 12, 2002, provisional application No. 60/453,308, filed on Mar. 10, 2003.

(51) Int. Cl.
*H04L 29/06* (2006.01)

(52) U.S. Cl.
USPC ................................... 713/1; 703/26; 703/27

(58) Field of Classification Search
USPC .................. 726/14; 703/26, 27; 713/26, 27, 713/1
See application file for complete search history.

(56) References Cited

U.S. PATENT DOCUMENTS

| | | |
|---|---|---|
| 5,155,847 A | 10/1992 | Kirouac et al. |
| 5,175,800 A | 12/1992 | Galis et al. |
| 5,247,683 A | 9/1993 | Holmes et al. |
| 5,249,274 A | 9/1993 | Sztipanovits et al. |
| 5,295,244 A | 3/1994 | Dev et al. |
| 5,339,435 A | 8/1994 | Lubkin et al. ................. 395/700 |
| 5,359,730 A | 10/1994 | Marron ........................ 395/650 |
| 5,421,009 A | 5/1995 | Platt ............................ 395/600 |
| 5,450,583 A | 9/1995 | Inada ........................... 395/650 |
| 5,459,837 A | 10/1995 | Caccavale ............... 395/184.01 |
| 5,471,617 A | 11/1995 | Farrand et al. ............... 395/700 |
| 5,495,610 A | 2/1996 | Shing et al. |
| 5,555,416 A | 9/1996 | Owens et al. |

(Continued)

FOREIGN PATENT DOCUMENTS

| | | |
|---|---|---|
| EP | 0952521 | 10/1999 |
| EP | 1091522 | 4/2001 |

(Continued)

OTHER PUBLICATIONS

Rightnour, T. "Clusterit version 2.0 (Archive)" TAR, 2001, pp. 1-30, XP002328731 Retrieved from the Internet: URL:http://www.garbled.net/download/clusterit-2.0.tar.gz>.

(Continued)

*Primary Examiner* — Jason Gee

(57) ABSTRACT

A method and system for managing a large number of servers and their server components distributed throughout a heterogeneous computing environment is provided. In one embodiment, an authenticated user, such as a IT system administrator, can securely and simultaneously control and configure multiple servers, supporting different operating systems, through a "virtual server." A virtual server is an abstract model representing a collection of actual target servers. To represent multiple physical servers as one virtual server, abstract system calls that extend execution of operating-system-specific system calls to multiple servers, regardless of their supported operating systems, are used. A virtual server is implemented by a virtual server client and a collection of virtual server agents associated with a collection of actual servers.

61 Claims, 14 Drawing Sheets

U.S. PATENT DOCUMENTS

| | | | |
|---|---|---|---|
| 5,586,304 A | 12/1996 | Stupek, Jr. et al. | |
| 5,586,322 A | 12/1996 | Beck et al. | |
| 5,596,579 A * | 1/1997 | Yasrebi | 719/328 |
| 5,649,196 A | 7/1997 | Woodhill et al. | 395/620 |
| 5,650,994 A | 7/1997 | Daley | |
| 5,655,081 A | 8/1997 | Bonnell et al. | |
| 5,664,106 A | 9/1997 | Caccavale | 395/200.54 |
| 5,678,002 A | 10/1997 | Fawcett et al. | |
| 5,694,546 A | 12/1997 | Reisman | |
| 5,696,895 A | 12/1997 | Hemphill et al. | 395/182.02 |
| 5,706,502 A | 1/1998 | Foley et al. | |
| 5,732,275 A | 3/1998 | Kullick et al. | |
| 5,742,829 A | 4/1998 | Davis et al. | |
| 5,748,896 A | 5/1998 | Daly et al. | |
| 5,752,042 A | 5/1998 | Cole et al. | |
| 5,764,992 A | 6/1998 | Kullick et al. | |
| 5,781,703 A | 7/1998 | Desai et al. | |
| 5,781,716 A | 7/1998 | Hemphill et al. | 395/182.02 |
| 5,819,033 A | 10/1998 | Caccavale | 395/200.11 |
| 5,832,503 A | 11/1998 | Malik et al. | |
| 5,835,911 A | 11/1998 | Nakagawa et al. | |
| 5,838,907 A | 11/1998 | Hansen | |
| 5,845,077 A | 12/1998 | Fawcett | |
| 5,860,012 A | 1/1999 | Luu | |
| 5,870,751 A | 2/1999 | Trotter et al. | |
| 5,872,928 A | 2/1999 | Lewis et al. | |
| 5,909,581 A | 6/1999 | Park | |
| 5,913,040 A | 6/1999 | Rakavy et al. | |
| 5,920,567 A | 7/1999 | Saito et al. | |
| 5,923,842 A * | 7/1999 | Pedersen et al. | 726/8 |
| 5,944,782 A | 8/1999 | Noble et al. | |
| 5,948,063 A | 9/1999 | Cooper et al. | 709/223 |
| 5,958,012 A | 9/1999 | Battat et al. | 709/224 |
| 5,961,588 A | 10/1999 | Cooper et al. | 709/203 |
| 5,974,258 A | 10/1999 | Ferri et al. | 395/712 |
| 5,987,497 A | 11/1999 | Allgeier | 709/201 |
| 5,996,010 A | 11/1999 | Leong et al. | |
| 5,996,017 A | 11/1999 | Cipiere | 709/229 |
| 6,003,075 A | 12/1999 | Arendt et al. | 709/221 |
| 6,009,274 A | 12/1999 | Fletcher et al. | |
| 6,011,288 A | 1/2000 | Lin et al. | |
| 6,012,100 A | 1/2000 | Frailong et al. | |
| 6,021,437 A | 2/2000 | Chen et al. | |
| 6,023,464 A | 2/2000 | Woundy | |
| 6,029,196 A | 2/2000 | Lenz | |
| 6,035,264 A | 3/2000 | Donaldson et al. | |
| 6,044,393 A | 3/2000 | Donaldson et al. | |
| 6,047,321 A | 4/2000 | Raab et al. | 709/224 |
| 6,049,671 A | 4/2000 | Slivka et al. | |
| 6,052,720 A | 4/2000 | Traversat et al. | |
| 6,052,722 A | 4/2000 | Taghadoss | 709/223 |
| 6,067,582 A | 5/2000 | Smith et al. | |
| 6,086,623 A * | 7/2000 | Broome et al. | 703/26 |
| 6,088,797 A | 7/2000 | Rosen | |
| 6,098,097 A | 8/2000 | Dean et al. | |
| 6,101,539 A | 8/2000 | Kennelly et al. | 709/223 |
| 6,108,420 A | 8/2000 | Larose et al. | |
| 6,112,237 A | 8/2000 | Donaldson et al. | 709/224 |
| 6,123,737 A | 9/2000 | Sadowsky | |
| 6,125,388 A | 9/2000 | Reisman | |
| 6,128,729 A | 10/2000 | Kimball et al. | |
| 6,134,593 A | 10/2000 | Alexander et al. | |
| 6,138,153 A | 10/2000 | Collins, III et al. | |
| 6,138,251 A | 10/2000 | Murphy et al. | 714/41 |
| 6,151,643 A | 11/2000 | Cheng et al. | 710/36 |
| 6,157,956 A | 12/2000 | Jensen et al. | |
| 6,163,796 A * | 12/2000 | Yokomizo | 709/203 |
| 6,167,358 A | 12/2000 | Othmer et al. | |
| 6,167,567 A | 12/2000 | Chiles et al. | |
| 6,182,139 B1 * | 1/2001 | Brendel | 709/226 |
| 6,185,466 B1 | 2/2001 | Nicewonger | |
| 6,192,354 B1 | 2/2001 | Bigus et al. | |
| 6,192,518 B1 | 2/2001 | Neal | |
| 6,195,760 B1 | 2/2001 | Chung et al. | 714/4 |
| 6,202,206 B1 | 3/2001 | Dean et al. | |
| 6,205,477 B1 | 3/2001 | Johnson et al. | 709/220 |
| 6,225,995 B1 * | 5/2001 | Jacobs et al. | 715/738 |
| 6,226,679 B1 | 5/2001 | Gupta | |
| 6,226,788 B1 | 5/2001 | Schoening et al. | |
| 6,229,540 B1 | 5/2001 | Tonelli et al. | 345/356 |
| 6,243,396 B1 | 6/2001 | Somers et al. | |
| 6,247,049 B1 | 6/2001 | Scott et al. | |
| 6,249,883 B1 | 6/2001 | Cassidy et al. | |
| 6,252,858 B1 | 6/2001 | Inoue et al. | |
| 6,256,668 B1 | 7/2001 | Slivka et al. | |
| 6,259,448 B1 | 7/2001 | McNally et al. | |
| 6,266,335 B1 | 7/2001 | Bhaskaran | |
| 6,266,809 B1 | 7/2001 | Craig et al. | |
| 6,268,872 B1 * | 7/2001 | Matsuda et al. | 345/473 |
| 6,282,175 B1 | 8/2001 | Steele et al. | |
| 6,286,038 B1 | 9/2001 | Reichmeyer et al. | |
| 6,286,041 B1 | 9/2001 | Collins, III et al. | |
| 6,286,042 B1 | 9/2001 | Hasselberg et al. | 709/223 |
| 6,289,380 B1 | 9/2001 | Battat et al. | 709/224 |
| 6,298,120 B1 | 10/2001 | Civanlar et al. | 379/88.17 |
| 6,304,549 B1 | 10/2001 | Srinivasan et al. | |
| 6,304,790 B1 | 10/2001 | Nakamura et al. | |
| 6,314,565 B1 | 11/2001 | Kenner et al. | |
| 6,324,576 B1 | 11/2001 | Newcombe et al. | 709/223 |
| 6,330,586 B1 | 12/2001 | Yates et al. | |
| 6,332,163 B1 | 12/2001 | Bowman-Amuah | 709/231 |
| 6,336,134 B1 | 1/2002 | Varma | 709/205 |
| 6,345,239 B1 | 2/2002 | Bowman-Amuah | |
| 6,347,398 B1 | 2/2002 | Parthasarathy et al. | |
| 6,349,306 B1 | 2/2002 | Malik et al. | |
| 6,356,863 B1 * | 3/2002 | Sayle | 703/27 |
| 6,381,628 B1 | 4/2002 | Hunt | |
| 6,389,126 B1 | 5/2002 | Bjornberg et al. | |
| 6,389,464 B1 | 5/2002 | Krishnamurthy et al. | |
| 6,393,386 B1 | 5/2002 | Zager et al. | |
| 6,396,810 B1 | 5/2002 | Hebel | |
| 6,401,116 B1 | 6/2002 | Okigami | 709/223 |
| 6,401,119 B1 | 6/2002 | Fuss et al. | 709/224 |
| 6,405,219 B2 | 6/2002 | Saether et al. | |
| 6,411,961 B1 | 6/2002 | Chen | |
| 6,418,555 B2 | 7/2002 | Mohammed | |
| 6,421,719 B1 | 7/2002 | Lewis et al. | |
| 6,442,564 B1 | 8/2002 | Frey et al. | |
| 6,457,076 B1 | 9/2002 | Cheng et al. | 710/36 |
| 6,460,070 B1 | 10/2002 | Turek et al. | 709/202 |
| 6,460,082 B1 | 10/2002 | Lumelsky et al. | 709/226 |
| 6,463,528 B1 | 10/2002 | Rajakarunanayake et al. | |
| 6,473,794 B1 | 10/2002 | Guheen et al. | 709/223 |
| 6,480,855 B1 | 11/2002 | Siefert | |
| 6,502,096 B1 | 12/2002 | Siefert | |
| 6,502,131 B1 | 12/2002 | Vaid et al. | |
| 6,505,245 B1 | 1/2003 | North et al. | |
| 6,516,337 B1 | 2/2003 | Tripp et al. | |
| 6,516,347 B1 | 2/2003 | Nakamura et al. | |
| 6,519,600 B1 | 2/2003 | Siefert | |
| 6,535,227 B1 | 3/2003 | Fox et al. | |
| 6,546,392 B1 | 4/2003 | Bahlmann | |
| 6,546,553 B1 | 4/2003 | Hunt | |
| 6,549,944 B1 | 4/2003 | Weinberg et al. | |
| 6,577,614 B1 | 6/2003 | Cook et al. | |
| 6,594,723 B1 | 7/2003 | Chapman et al. | |
| 6,598,090 B2 | 7/2003 | Champlin | |
| 6,604,238 B1 | 8/2003 | Lim et al. | |
| 6,618,366 B1 | 9/2003 | Furukawa et al. | |
| 6,633,907 B1 | 10/2003 | Spencer et al. | |
| 6,658,426 B1 | 12/2003 | Poskanzer | |
| 6,662,221 B1 | 12/2003 | Gonda et al. | |
| 6,686,838 B1 | 2/2004 | Rezvani et al. | |
| 6,708,195 B1 | 3/2004 | Borman et al. | |
| 6,718,379 B1 | 4/2004 | Krishna et al. | |
| 6,725,451 B1 | 4/2004 | Schuetz et al. | |
| 6,728,748 B1 | 4/2004 | Mangipudi et al. | |
| 6,732,269 B1 | 5/2004 | Baskey et al. | |
| 6,732,358 B1 | 5/2004 | Siefert | |
| 6,738,908 B1 | 5/2004 | Bonn et al. | |
| 6,751,702 B1 | 6/2004 | Hsieh et al. | |
| 6,754,707 B2 | 6/2004 | Richards et al. | |
| 6,763,361 B1 | 7/2004 | Poskanzer | |
| 6,775,830 B1 | 8/2004 | Matsunami et al. | |
| 6,801,949 B1 | 10/2004 | Bruck et al. | |
| 6,802,061 B1 | 10/2004 | Parthasarathy et al. | |
| 6,816,897 B2 | 11/2004 | McGuire | |

| | | | |
|---|---|---|---|
| 6,816,903 | B1 | 11/2004 | Rakoshitz et al. |
| 6,816,964 | B1 | 11/2004 | Suzuki et al. |
| 6,826,604 | B2 | 11/2004 | Yamaguchi et al. |
| 6,834,389 | B1 | 12/2004 | Glass |
| 6,880,086 | B2 | 4/2005 | Kidder et al. |
| 6,964,034 | B1 | 11/2005 | Snow |
| 6,983,317 | B1 | 1/2006 | Bishop et al. |
| 6,986,133 | B2 | 1/2006 | O'Brien et al. |
| 7,013,462 | B2 | 3/2006 | Zara et al. |
| 7,054,924 | B1 | 5/2006 | Harvey et al. |
| 7,076,567 | B1 | 7/2006 | Chasman et al. |
| 7,124,289 | B1 | 10/2006 | Suorsa |
| 7,131,123 | B2 | 10/2006 | Suorsa et al. |
| 7,149,789 | B2 | 12/2006 | Slivka et al. |
| 7,231,436 | B1 | 6/2007 | Dalfo et al. |
| 7,237,002 | B1 | 6/2007 | Estrada et al. |
| 2001/0034733 | A1 | 10/2001 | Prompt et al. ............... 709/102 |
| 2002/0010773 | A1 | 1/2002 | Meleis |
| 2002/0010803 | A1* | 1/2002 | Oberstein et al. ............ 709/318 |
| 2002/0010910 | A1 | 1/2002 | Crudele et al. |
| 2002/0019870 | A1 | 2/2002 | Chirashnya et al. ......... 709/224 |
| 2002/0035501 | A1 | 3/2002 | Handel et al. |
| 2002/0059402 | A1* | 5/2002 | Belanger ...................... 709/220 |
| 2002/0062334 | A1 | 5/2002 | Chen et al. |
| 2002/0065878 | A1 | 5/2002 | Paxhia et al. |
| 2002/0065926 | A1* | 5/2002 | Hackney et al. ............. 709/231 |
| 2002/0069369 | A1* | 6/2002 | Tremain ....................... 713/201 |
| 2002/0082818 | A1 | 6/2002 | Ferguson et al. |
| 2002/0082819 | A1 | 6/2002 | Ferguson et al. |
| 2002/0082820 | A1 | 6/2002 | Ferguson et al. |
| 2002/0082821 | A1 | 6/2002 | Ferguson et al. |
| 2002/0083146 | A1 | 6/2002 | Ferguson et al. |
| 2002/0083166 | A1 | 6/2002 | Dugan et al. ................. 709/223 |
| 2002/0095522 | A1 | 7/2002 | Hayko et al. |
| 2002/0107901 | A1* | 8/2002 | Hay .............................. 709/102 |
| 2002/0107954 | A1 | 8/2002 | Ferguson et al. |
| 2002/0133579 | A1 | 9/2002 | Bernhardt et al. ........... 709/223 |
| 2002/0143904 | A1 | 10/2002 | Bair |
| 2002/0154751 | A1 | 10/2002 | Thompson et al. |
| 2002/0156831 | A1 | 10/2002 | Suorsa et al. |
| 2002/0156874 | A1 | 10/2002 | Suorsa et al. |
| 2002/0156894 | A1 | 10/2002 | Suorsa et al. |
| 2002/0158898 | A1 | 10/2002 | Hsieh et al. |
| 2002/0161861 | A1 | 10/2002 | Greuel ......................... 709/220 |
| 2002/0166001 | A1 | 11/2002 | Cheng et al. .................... 710/1 |
| 2002/0169870 | A1 | 11/2002 | Vosseler et al. .............. 709/224 |
| 2002/0194584 | A1 | 12/2002 | Suorsa et al. |
| 2002/0198840 | A1* | 12/2002 | Banka et al. ..................... 705/50 |
| 2003/0023341 | A1 | 1/2003 | Sagawa et al. |
| 2003/0078959 | A1 | 4/2003 | Yeung et al. |
| 2003/0084104 | A1* | 5/2003 | Salem et al. ................. 709/205 |
| 2003/0110259 | A1* | 6/2003 | Chapman et al. ............ 709/225 |
| 2003/0135596 | A1 | 7/2003 | Moyer et al. |
| 2003/0149756 | A1 | 8/2003 | Grieve et al. |
| 2003/0158861 | A1 | 8/2003 | Sawdon et al. |
| 2003/0229686 | A1 | 12/2003 | Kortright |
| 2003/0233431 | A1 | 12/2003 | Reddy et al. |
| 2003/0233571 | A1 | 12/2003 | Kraus et al. |
| 2003/0233851 | A1 | 12/2003 | Yang et al. |
| 2004/0226010 | A1 | 11/2004 | Suorsa |
| 2005/0044544 | A1 | 2/2005 | Slivka et al. |
| 2005/0246436 | A1 | 11/2005 | Day et al. |
| 2007/0037095 | A1 | 2/2007 | Sasa |

FOREIGN PATENT DOCUMENTS

| | | |
|---|---|---|
| WO | WO-9108542 | 6/1991 |
| WO | WO-9826548 | 6/1998 |
| WO | WO-98/47057 | 10/1998 |
| WO | WO-9853397 | 11/1998 |
| WO | WO 99/31584 A | 6/1999 |
| WO | WO-02/37212 | 5/2002 |
| WO | WO-02/37262 | 5/2002 |
| WO | WO-02/37273 | 5/2002 |
| WO | WO-02/37282 | 5/2002 |
| WO | WO-02/039313 | 5/2002 |
| WO | WO-0239257 | 5/2002 |

OTHER PUBLICATIONS

Pawlowski, B. et al. "The NFS Version 4 Protocol" Proceedings of the International System Administration and Networking Conference, May 22, 2000, pp. 1-20.

Anonymous: "LSF JobScheduler User's Guide" Platform Computing Corporation, Aug. 1998, pp. 1-138. Retrieved from the Internet URL:http://www.urz.uni-heidelberg.de/1sf3.2/pdf/jsusers.pdf> pp. 45-58.

Anonymous: "OpenBSD SSH(1) Manual Page" openbsd.org, 1999, pp. 1-9. Retrieved from the Internet: URL:http://www.openbsd.org/cgi-bin/man.cgi?query=ssh>.

Anonymous: "OpenBSD SSHD (8) Manual" openbsd.org, 1999, pp. 1-7. Retrieved from the Internet: URL:http://www.openbsd.org/cgi-bin/man.cgi?query=sshd>.

Anonymous: "OpenBSD SSH_CONF1G(5) Manual" openbsd.org, 1999, pp. 1-7. Retrieved from the Internet URL:http:///www.openbsd.org/cgi-bin/man.cgi?query=ssh_config>.

Anonymous: "OpenBSD SSHD_CONFIG(5) Manuel" openbsd.org, 1999, pp. 1-7. Retrieved from the Internet URL:http://www.openbsd.org/cgi-bin/man.cgi ?query=sshd_config>.

Deraadt: "OpenBSD ssh.c cvs revision 1.1" openbsd.org, 1999, pp. 1-10. Retrieved from the Internet URL:http//www.openbsd.org/cgi-bin/cvsweb/src/usr.bin/ssh/ssh.c?rev=1.1&content-type=text/x-cvsweb-markup>.

Deraadt: "OpenBSD sshd.c cvs revision 1.1" 1999, pp. 1-29. Retrieved from the Internet URL:http://www.openbsd.org/cgi-bin/cvsweb/src/usr.bin/ssh/sshd.c?rev=1.1&content-type=text/x-cvsweb-markup>.

International Search Report for International Application No. PCT/US2003/17927, dated Jun. 24, 2005 (11 pgs.).

U.S. Appl. No. 10/414,887, filed Apr. 16, 2003, Nguyen.

Jonathan Abbey, The Group Administration Shell and the GASH Network Computing Environment, 1994 LISA, Sep. 19-23, 1994, pp. 191-203, San Diego, CA, USA.

Lee "Leonardo" Amatangelo, Unleashing the Power of JumpStart: A New Technique for Disaster Recovery, Cloning, or Snapshotting a Solaris System, LISA 2000, Dec. 3-8, 2000, pp. 219-228, New Orleans, LA, USA.

Paul Anderson, Towards a High-Level Machine Configuration System, 1994 LISA, Sep. 19-23, 1994, pp. 19-26, San Diego, CA, USA.

Charles Beadnall et al., CfAdmin: A User Interface for Cfengine, LISA 2001, Dec. 2-7, 2001, pp. 277-281, San Diego, CA, USA.

John D. Bell, A Simple Caching File System for Application Serving, LISA 1996, Sep. 29 to Oct. 4, 1996, pp. 171-179, Chicago, IL, USA.

Gerald Carter, Patch 32: A System for Automated Client OS Updates, LISA 1998, Aug. 5-8, 1998, Seattle, WA, USA.

Jurgen Christoffel, Bal—A Tool to Synchronize Document Collections Between Computers, LISA 1997, Oct. 1997, pp. 85-88, San Diego, CA, USA.

Lionel Cons et al., Pan: A High-Level Configuration Language, LISA 2002, Nov. 3-8, 2002, pp. 83-98, Philadelphia, PA, USA.

Alva L. Couch, Chaos Out of Order. A Simple, Sealable File Distribution Facility for 'Intentionally Heterogeneous' Networks, LISA 1997, Oct. 1997, pp. 169-178, San Diego, CA, USA.

Alva L. Couch, Slink: Simple, Effective Filesystem Maintenance Abstractions for Community-Based Administration, LISA 1996, Sep. 29 to Oct. 4, 1996, pp. 205-212, Chicago, IL, USA.

Fabio Q.B. Da Silva et al., An NFS Configuration Management System and its Underlying Object-Oriented Model, LISA 1998, Dec. 6-11, 1998, pp. 121-130, Boston, MA, USA.

E. Fernandez Defert, PH., Managing and Distributing Application Software, LISA 1996, Sep. 29 to Oct. 4, 1996, pp. 213-226, Chicago, IL, USA.

Gledson Elias De Silveira et al., A Configuration Distribution System for Heterogeneous Networks, LISA 1998, Dec. 6-11, 1998, pp. 109-119. Boston, MA, USA.

Remy Evard, An Analysis of UNIX System Configuration, LISA 1997, Oct. 1997, pp. 179-193, San Diego, CA, USA.

Remy Evard, Tenwen: The Re-engineering of a Computing Environment, 1994 LISA, Sep. 19-23, 1994, pp. 37-46, San Diego, CA, USA.

Jon Finke, Automation of Site Configuration Management, LISA 1997, Oct. 1997, pp. 155-168, San Diego, CA, USA.

Jon Finke, Automating Printing Configuration, 1994 LISA, Sep. 19-23, 1994, pp. 175-183, San Diego, CA, USA.
Michael Fisk, Automating the Administration of Heterogeneous LANs, LISA 1996, Sep. 29 to Oct. 4, 1996, pp. 181-186, Chicago, IL, USA.
Robert Fulmer et al., AutoInstall for NT: Complete NT Installation Over the Network, LISA 1998, Aug. 5-8, 1998, Seattle, WA, USA.
John L. Furlani et al., Abstract Yourself With Modules, LISA 1996, Sep. 29 to Oct. 4, 1996, pp. 193-203, Chicago, IL, USA.
Atsushi Futakata, Patch Control Mechanism for Large Scale Software, LISA 1995, Sep. 18-25, 1995, pp. 213-219, Monterey, CA, USA.
Robin Garner, Pelican DHCP Automated Self-Registration System: Distributed Registration and Centralized Management, LISA 2001, pp. 257-266, San Diego, CA, USA.
Xev Gittler et al., Morgan Stanley's Aurora System: Designing a Next Generation Global Production Unix Environment LISA 1995, Sep. 17-22, 1995, pp. 47-58, Monterey, CA, USA.
Michail Gomberg et al., A Comparison of Large-Scale Software Installation Methods on NT and UNIX, LISA 1998, Aug. 5-8, 1998, Seattle, WA, USA.
Uri Guttman, Stem: The System Administration Enabler, LISA 2002, Nov. 3-8, 2002, pp. 75-81, Philadelphia, PA, USA.
Dr. Magnus Harlander, Central System Administration in a Heterogeneous Unix Environment: GeNUAdmin, 1994 LISA, Sep. 19-23, 1994, pp. 1-8, San Diego, CA, USA.
Jason Heiss, Enterprise Rollouts with JumpStart, LISA 1999, Nov. 7-12, 1999, pp. 267-274, Seattle, WA, USA.
Chris Hemmerich, Automating Request-based Software Distribution, LISA 2000, Dec. 3-8, 2000, pp. 197-205, New Orleans, LA, USA.
Imazu Hideyo, OMNICONF—Making OS Upgrades and Disk Crash Recovery Easier, 1994 LISA, Sep. 19-23, 1994, pp. 27-31, San Diego, CA, USA.
Dirk Hohndel et al., Automated Installation of Linux Systems Using YaST, LISA 1999, Nov. 7-12, 1999, pp. 261-266, Seattle, WA, USA.
Matt Holgate et al., The Arusha Project: A Framework for Collaborative Unix System Administration, LISA 2001, Dec. 2-7, 2001, pp. 187 to 197, San Diego, CA, USA.
Harry Kaplan, Highly Automated Low Personnel System Administration in a Wall Street Environment, 1994 LISA, Sep. 19-23, 1994, pp. 185-189, San Diego, CA, USA.
Conrad E. Kimball et al., Automated Client-side Integration of Distributed Application Servers, LISA 1999, Nov. 7-12, 1999, pp. 275-282, Seattle, WA, USA.
Sam Lipson, Capital Markets Trading Floors, Current Practice, LISA 1995, Sep. 18-22, 1995, pp. 35-45, Monterey, CA, USA.
John Lockard et al., Synctree for Single Point Installation, Upgrades, and OS Patches, LISA 1998, Dec. 6-11, 1998, pp. 261270, Boston, MA, USA.
Cameron D. Luerkens et al., Software Distribution to PC Clients in an Enterprise Network, LISA 1998, Aug. 5-8, 1998, Seattle, WA, USA.
Andrew Mayhew, File Distribution Efficiencies: cfengine vs. rsync, LISA 2001, Dec. 2-7, 2001, pp. 273-276, San Diego, CA, USA.
Mark Miller et al., Centralized Administration of Distributed Firewalls, LISA 1996, Sep. 29 to Oct. 4, 1996, pp. 19-23, Chicago, IL, USA.
David Moore et al., The CoralReef Software Suite as a Tool for System and Network Administrators, LISA 2001, Dec. 2-7, 2001, pp. 133-144, San Diego, CA, USA.
Tobias Oetiker, SEPP—Software Installation and Sharing System, LISA 1998, Dec. 6-11, 1998, pp. 253-259, Boston, MA, USA.
Tobias Oetiker, Template Tree II: The Post-Installation Setup Tool, LISA 2001, Dec. 2-7, 2001, pp. 179-185, San Diego, CA, USA.
Kyle Oppenheim et al., Deployme: Tellme's Package Management and Deployment System, LISA 2000, Dec. 3-8, 2000, pp. 187-196, New Orleans, LA, USA.
Peter W. Osel et al., OpenDist—Incremental Software Distribution, LISA 1995, Sep. 18-25, 1995, pp. 181-193, Monterey, CA, USA.
Todd Paynor, Automating Infrastructure Composition for Internet Services, LISA 2001, Dec. 2-7, 2001, pp. 169-177, San Diego, CA, USA.
David Ressman et al., Use of Cfengine for Automated, Multi-Platform Software and Patch Distribution, LISA 2000, Dec. 3-8, 2000, pp. 207-218, New Orleans, LA, USA.
Paul Riddle, Automated Upgrades in a Lab Environment, 1994 LISA, Sep. 19-23, 1994, pp. 33-36, San Diego, CA, USA.
R.P.C. Rodgers et al., A Management System for Network-Sharable Locally Installed Software: Merging RPM and the D Scheme Under Solaris, LISA 2001, Dec. 2-7, 2001, pp. 267-272, San Diego, CA, USA.
John P. Rouillard et al., Config: A Mechanism for Installing and Tracking System Configurations, 1994 LISA, Sep. 19-23, 1994, pp. 9-17, San Diego, CA, USA.
Gottfried Rudorfer, Managing PC Operating Systems with a Revision Control System, LISA 1997, Oct. 26 to Oct. 31, 1997, pp. 79-84, San Diego, CA, USA.
Frode Eika Sandnes, Scheduling Partially Ordered Events in a Randomized Framework—Empirical Results and Implications for Automatic Configuration Management, LISA 2001, Dec. 2-7, 2001, pp. 47-62, San Diego, CA, USA.
Jurgen Schonwalder, Specific Simple Network Management Tools, LISA 2001, Dec. 2-7; 2001, pp. 109-119, San Diego, CA, USA.
John Sellens, filetsf: A File Transfer System Based on Ipr/Ipd, LISA 1995, Sep. 18-25, 1995, pp. 195-202, Monterey, CA, USA.
Michael E. Shaddock et al., How to Upgrade 1500 Workstations on Saturday, and Still Have Time to Mow the Yard on Sunday, LISA 1995, Sep. 18-25, 1995, pp. 59-65, Monterey, CA, USA.
Carl Staelin, mkpkg: A Software Packaging Tool, LISA 1998, Dec. 6-11, 1998, pp. 243-252, Boston, MA, USA.
Carl W. Symborski, Updating Software and Configuration Data in a Distributed Communications Network, Proceedings of the Computer Networking Symposium, 1988, Apr. 11-13, 1988, pp. 331-338.
Gregory S. Thomas et al., UNIX Host Administration in a Heterogeneous Distributed Computing Environment, LISA 1996, Sep. 29 to Oct. 4, 1996, pp. 43-50, Chicago, IL, USA.
Steve Traugott et al., Why Order Matters: Turing Equivalence in Automated Systems Administration, LISA 2002, Nov. 3-8, 2002, pp. 99-120, Philadelphia, PA, USA.
Jim Trocki, PC Administration Tools: Using Linux to Manage Personal Computers, LISA 1996, Sep. 29 to Oct. 4, 1996, pp. 187-192, Chicago, IL, USA.
V.N. Venkatakrishnan et al., An Approach for Secure Software Installation, LISA 2002, Nov. 3-8, 2002, pp. 219-226, Philadelphia, PA, USA.
C.S. Yang et al., Design and Implementation of an Administration System for Distributed Web Server, LISA 1998, Dec. 6-11, 1998, pp. 131-139. Boston, MA, USA.
Office Action mailed Jul. 25, 2006 in U.S. Appl. No. 10/414,887.
Office Action mailed Apr. 6, 2006 in U.S. Appl. No. 10/414,958.
U.S. Appl. No. 90/008,425, filed Jan. 30, 2007, Suorsa.
Aggarwal et al., "A Flexible Multicast Routing Protocal for Group Communication," Computer Networks 32 (2000), pp. 35-60.
Anonymous: "Windows Installer Service Overview" Retrieved from the Internet: <http://download.microsoft.com/download/f/7/7/f777da84-f82d-4b90-a597-e329e09032b0/WIS-Pro.doc>, (19 pages).
Bailey "Maximum RPM—Taking the Red Hat Package Manager to the Limit" Retrieved from the Internet: <http://www.rpm.org/local/maximum-rpm.ps.gz>, Feb. 17, 1997 (452 pages).
Bredin et al., "Market-based Resource Control for Mobile Agents" 1998, (8 pages).
"Designs for Uncommitting and Install Plan Object" IBM Technical Disclosure Bulletin, IBM Corp. New York, vol. 38, No. 7, Jul. 1, 1995, pp. 227-229.
Entry for "SSL" (1 page).
European Search Report for European Patent Application No. 06026526.1, dated Mar. 2, 2007, (9 pages).
European Search Report for European Patent Application No. 06026527.9, dated Feb. 26, 2007, (10 pages).
European Search Report for European Patent Application No. 03760238.0, dated Feb. 21, 2007, (7 pages).
Gilmore, et al. "Secure Remote Access to an Internet Web Server," IEEE Network, Nov./Dec. 1999, pp. 31-37.

Hall RS, et al.; Institute of Electrical and Electronics Engineers, "Evaluating Software Deployment Languages and Schema: An Experience Report" Proceedings of the International Conference of Software Maintenance, Los Alamitos, CA: IEEE Computer Soc, US, vol. Conf. 14, Nov. 16, 1998, pp. 177-185.

Hess, David K. et al. "A Unix Network Protocol Security Study: Network Information Service," Technical Report, 1992, A&M University, Texas, USA (5 pages).

"Oracle Intelligent Agent User's Guide" Oracle Corporation, Release 8.1.7, Sep. 2000, Part No. A85251-01 (95 pages).

Perkins, "Mobile IP Joins Forces with AAA," IEEE Personal Communications, Aug. 2000, pp. 59-61.

Pidd et al. "Component-Based Simulation on the Web?" Proceedings of the 1999 Winter Simulation Conference, Dec. 99, pp. 1438-1444.

Rabinovich et al. "RaDaR: A Scalable Architecture for a Global Web Hosting Service" Computer Networks 31 (1999) pp. 1545-1561.

Shirey, R. "Internet Security Glossary" Network Working Group, GTE/BBN Technologies, The Internet Society (2000), (2 pages).

Winer, Dave, "XML-RPC Specification," Jun. 15, 1999, available at <http://www.xmlrpc.com/spec>, accessed Jan. 10, 2007, (7 pages).

Xu, Jun et al. "Networked Windows NT System Field Failure Data Analysis" Center for Reliable and High Performance Computing, University of Illinois at Urbana-Champaign, 1999, (8 pages).

Yan, et al. "The SIFT Information Dissemination System" Dec. 1999, pp. 1-39.

Examination Report for European Patent Application No. 03760238.0, dated Sep. 5, 2006, (11 pages).

Examination Report for European Patent Application No. 06026526.1, dated Oct. 12, 2007, (6 pages).

Examination Report for European Patent Application No. 06026527.9, dated Mar. 19, 2008, (7 pages).

OMG, "The Common Object Request Broker: Archetchture and Specification. Revision 2.0", Jul. 1995, (30 pages).

Summons to Attend Oral Proceedings for European Patent Application No. 03760238.0, dated Nov. 7, 2007, (10 pages).

Bovet, Daniel P., et al., "Understanding the Lunux Kernel From I/O Ports to Process Management ", Oct. 2000, pp. 217-230 (16 pages).

Preliminary Study of Appeal for European Patent Application No. 03760238.0, (Jul. 19, 2012), 13 pages.

Examination Report for European Patent Application No. 06026527.9, (Dec. 29, 2009), 6 pages.

Examination Report for European Patent Application No. 06026526.1, (Sep. 18, 2009), 6 pages.

Decision from Board of Appeal at the European Patent Office received for European Patent Application No. 03760238.0, mailed on Dec. 12, 2012, 17 pages.

* cited by examiner

METHOD AND SYSTEM FOR SIMPLIFYING DISTRIBUTED SERVER MANAGEMENT

CROSS-REFERENCE TO RELATED APPLICATION

This application claims priority to and the benefit of U.S. Provisional Patent Application Ser. No. 60/388,112 filed Jun. 12, 2002, entitled METHOD AND SYSTEM FOR SIMPLIFYING SERVER MANAGEMENT, and U.S. Provisional Patent Application (Ser. No. 60/453,308 filed Mar. 10, 2003, entitled METHOD AND SYSTEM FOR SIMPLIFYING SERVER MANAGEMENT, the entire disclosures of which are hereby incorporated by reference.

TECHNICAL FIELD

This invention relates to the field of server management and, more particularly, to the management of servers in a heterogeneous computing environment.

BACKGROUND INFORMATION

Information Technology (IT) administrators are facing new challenges due to a significant increase in the number of servers in an enterprise's IT infrastructure and the adoption of distributed electronic business applications. These challenges have resulted from: (1) a transition from client-server to Internet-based architectures, resulting in frequent interactions between different types of servers; and (2) the use of component application servers, such as J2EE (JavaJAVA 2 Platform, Enterprise Edition) and .NET platform, to generate components, tools, systems, and complex application models. Faced with these challenges, an IT administrator may need to juggle hundreds of incompatible software application configurations and track thousands of server components for the thirty to forty servers he or she manages.

Currently available configuration tools are inadequate to manage a large number of software application configuration and server components across multiple servers in a heterogeneous computing environment. To manage and configure heterogeneous servers, particularly in the complex business computing infrastructure, many IT administrators use enterprise systems management (ESM) products offering monitoring tools to automate problem identification across multiple servers. However, these monitoring tools do not provide a centralized management system with a centralized configuration database, which can centrally keep track of current server components and their interdependencies across the different servers.

In addition, these ESM products provide little or no help in correcting or configuring server components in a heterogeneous computing environment. For UNIX and LINUX operating system-based servers, despite the open-source and internally developed tools and scripts to handle simple configuration changes to J2EE configurations, neither the tools nor the scripts can be easily extended to address complex distributed applications.

MICROSOFT WINDOWS-based operating system servers are even more difficult to correct and configure than UNIX and LINUX operating system based servers, due to a large number of server components having complex interdependencies. Although system management tools are available from Microsoft Corporation, they have been designed to target only small-scale homogenous MICROSOFT WINDOWS-based computing environments, and not the large and heterogeneous computing environment supporting multiple operating systems that most IT administrators have to manage.

Because of the inadequacies in currently available management tools, significant portions of any server configuration change operations have to be made manually by the IT administrator for each server. Accordingly, human errors can occur from these manual change operations, and from manual monitoring and tracking of each server's configuration, resulting in frequent server misconfigurations and system downtime.

SUMMARY OF THE INVENTION

To alleviate this situation, systems and methods according to the invention can be used to manage a large number of servers and their server components distributed throughout a heterogeneous computing environment.

In one embodiment, an authenticated user, such as a IT system administrator, can securely and simultaneously control and configure multiple servers, supporting different operating systems, by implementing a virtual server from the user's management system. In one embodiment, the user is authenticated by an operating-system-user-context-inheritance model or standard authentication protocols, such as a public key protocol, a Kerberos protocol, or a shared secret protocol.

In some embodiments, a "virtual server" model is used. A virtual server is an abstract model representing a collection of actual target servers. To represent these multiple physical servers as one virtual server, the abstract system calls that extend execution of operating-system-specific system calls to multiple servers regardless of their supported operating systems are used. A virtual server is implemented by a virtual server client and a collection of virtual server agents associated with a collection of actual servers. The virtual server client may be implemented by a network-aware code library, such as "libnc," which is implemented as a network-aware version of the "libc" library. In another embodiment, the virtual server client is a library, such as "libnc."

The user's management system contains a software application system, such as a command program (also referred to as a command line interface) or a configuration manager, which generates abstract system calls to request services to be performed on the target servers. In one embodiment, the virtual server client receives the abstract system calls and instantiates the abstract system calls in a thread-safe manner. The thread-safe instantiation ensures simultaneous execution of the system calls on multiple target servers, while sharing the single virtual server client among these multiple target servers and their associated virtual server agents. In the instantiating process, the virtual server client identifies the target server(s) and their associate virtual server agent(s) to receive the abstract system calls. In one embodiment, the virtual server client identifies the target server(s) in response to a server identifier included in the abstract system call. Examples of the server identifier include a host name specified in a path and a network address. The server identifier may also be inferred from a group of servers to which the target server belongs.

Also, in the instantiating process, the virtual server client transmits the abstract system calls to the identified virtual server agent for execution on the target server. Before the transmission of the abstract system call, the virtual server client may encrypt the abstract system calls using standard encryption protocols, such as the SSL protocol, the Kerberos protocol, or the shared secret protocol, to secure communication between the virtual server client and the virtual server agent. In addition, before the transmission of the abstract system call, the virtual server client may specify priority, CPU utilization, and/or memory utilization of the abstract system call on the identified target server.

After the virtual server agent receives the abstract system calls from the virtual server client, the virtual server agent translates the abstract system call into an operating system-specific system call, so that system call can be executed on the operating system-specific target server. Before translating the abstract system call, in one embodiment, the virtual server agent identifies the source host of the user's management system to determine the encryption protocol used on the abstract system call. The virtual server agent decrypts the abstract system call after learning about the encryption protocol used by the virtual server client. From the decrypted abstract system call, the virtual server agent identifies the authenticated user. In addition, the virtual server agent contains software modules that can map the authenticated user (presented user) to another user (effective user) and locate a corresponding local user identity on the target server for the effective user, and impersonate the effective user as a local user on the target server associated with the virtual server agent. In one embodiment, if the effective user is not identified as a recognized local user on the target server, the user is designated as a local guest user on the target server. The virtual server agent further restricts the user's access to the target server through a software module that limits the user to performing predetermined actions or accessing predetermines resources on the target server, based on a role-based access control model and/or access control lists (ACLs).

The translated system calls are then executed on the target server in a thread-safe manner and the results of the execution are transported from the virtual server agent to the virtual server client. In one embodiment, the virtual server agent maintains an audit log to record the names of users and the abstract system calls executed on the target server.

In another embodiment, the application system can aggregate multiple abstract system calls into a single high-level abstract system call, which in turn is transported to the virtual server client. After receiving the high-level abstract system call, the virtual server client disintegrates the high-level abstract system call into the original multiple abstract system calls and instantiates these original abstract system calls individually. Accordingly, the virtual server agent receives the individual abstract system calls for execution on the associated target server.

In yet another embodiment, after receiving the high-level abstract system call from the application program, the virtual server client instantiates the high-level abstract system call as a whole. Thus, the identified virtual server agent receives the high-level abstract system call, rather than the original multiple abstract system calls. The virtual server agent in turn translates the high-level abstract system into the individual operating system-specific system calls to be executed on its associated target server.

In another embodiment, the virtual server modifies an existing non-distributed application supporting only one specific operating system to function as a network-aware application that is applicable across servers or devices supporting different operating systems by substituting a non network-aware system call with an abstract system call. In one exemplary embodiment, a non-distributed Unix shell program can function as a network-aware application program that is adaptable across multiple servers or devices supporting non-Unix operating systems. In another exemplary embodiment, non-distributed scripting languages, such as Perl and Python, can function as network aware-application programs that are applicable across multiple servers and devices supporting different operating systems.

In another embodiment, software configuration components (also referred to as server objects) having intricate inter-dependencies with other server components can be defined and characterized under a single unified system. Through this unified system, fine-grain application change operations can be uniformly and simultaneously implemented across the heterogeneous servers, rather than implementing different application change operations for each of the servers individually.

In yet another embodiment, a centralized management system can automatically track changes, configure, and manage multiple servers to provide compliance in accordance with pre-defined policies by incorporating the methods and systems described above.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
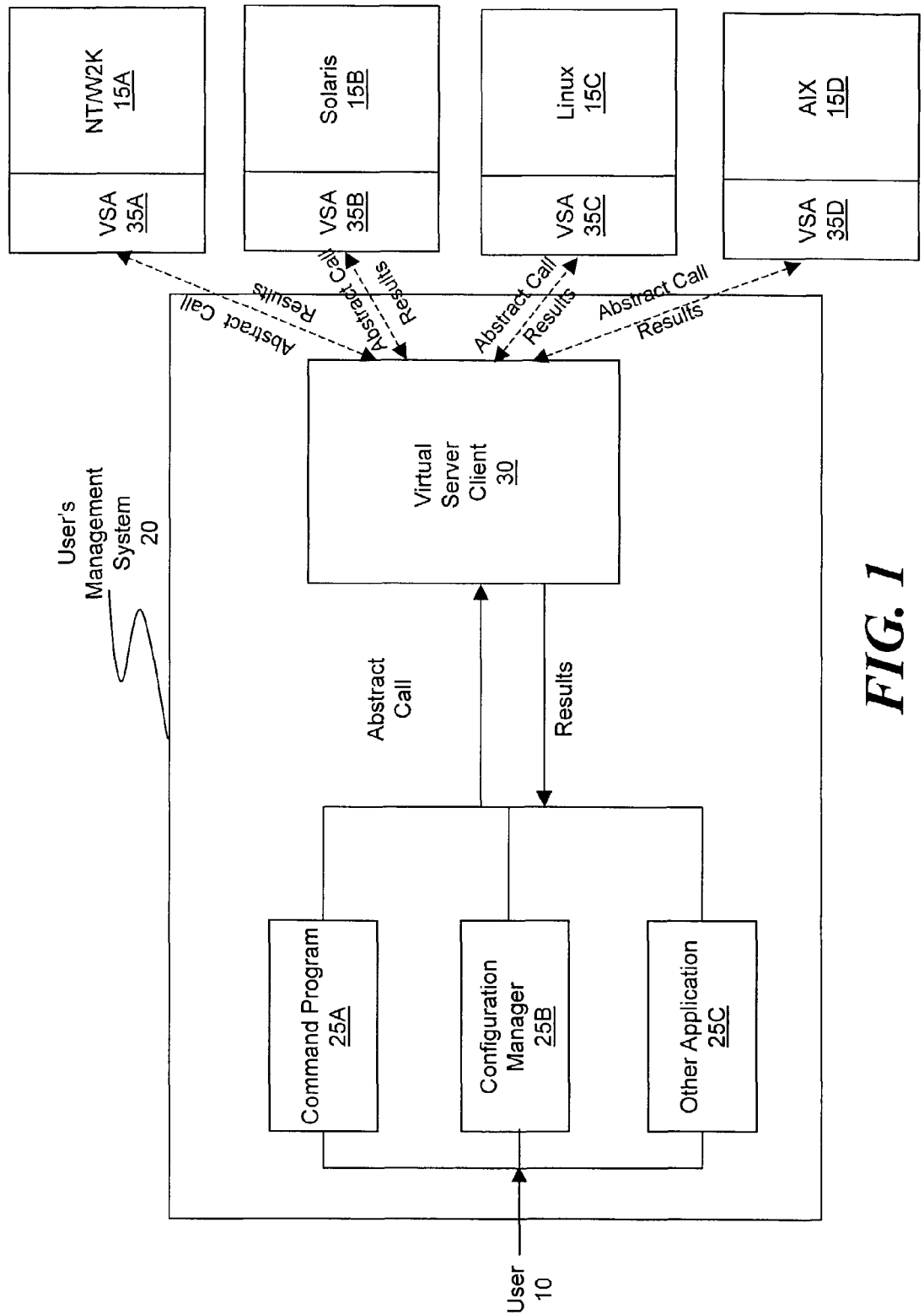
FIG. 1 is a block diagram depicting an embodiment of a system for managing multiple servers in a heterogeneous computing environment.

Referring to FIG. 1, a user 10, such as a system administrator, manages a number of servers 15A, 15B, 15C, 15D, generally 15, which are computers, each of which can be of the same or of different types than the other servers 15. The servers 15 are typically server-class general-purpose computers, which provide services (e.g. software applications and/or data) to other computers via one or more computer networks. For example, the servers may be application servers, routers, firewalls, load balancers, storage controllers, or a combination of these or other computers or network devices.

Examples of application servers are databases, such as the ORACLE database from Oracle Corporation of Redwood City, Calif. or other business applications. Application servers may also include web servers, such as the Apache web server from the Apache Foundation, and Internet Information Server (IIS) from Microsoft Corporation of Redmond, Wash. In addition to these examples, other programs can be provided by the servers 15. It should be understood that as used herein, the term "server" is not limited to server-class computers or application servers, but refers generally to computers on which the embodiments of the invention operate, which may include other types of computers or network devices.

As shown, each of the servers 15 may use a different operating system. For example, server 15A uses MICROSOFT WINDOWS (e.g., WINDOWS NT and WINDOWS 2000), available from Microsoft Corporation of Redmond, Wash.; server 15B uses SUN SOLARIS, available from Sun Microsystems, Inc. of Santa Clara, Calif.; server 15C uses RED HAT LINUX, available from Red Hat, Inc. of Durham, N.C.; and server 15D uses IBM AIX, available from IBM of Armonk, N.Y. It will be understood that this is just one example of the operating systems that may be used on the servers 15, and other combinations and operating systems may be used on the servers 15 in accordance with embodiments of the invention. One of the benefits of the system is its ability to operate in an environment having heterogeneous servers.

In one embodiment, the user 10 manages the servers 15 via a management system 20. The management system 20 is typically a server-class computer that provides the user 10 with an ability to manager servers 15 in a consistent manner through use of application programs 25. The management system 20 may be one of the servers 15, or any server-class computer that can communicate with the servers 15 over a network. Any of the target servers 15 can be designated as the management system, as long as the designated server includes appropriate application programs and software modules to manage remotely located servers.

Application programs 25 in the management system 20 can include one or more of a command-line shell program 25A and related programs for executing shell commands (e.g., UNIX shell commands such as ls, mv, rm, etc.), a configuration manager 25B for managing system configuration, and/or other applications 25C. The application programs 25, which in some implementations are "network-aware," communicate abstract system calls to a virtual server client 30, which in turn communicates the abstract system calls to the servers 15 that are the target(s) for execution of the operations requested by the abstract system calls. Advantageously, through use of the abstract system calls, the "network-aware" applications are able to request services from heterogeneous servers supporting different operating systems without having to modify their architecture to support each of the different operating systems.

For example, the user 10 enters commands, such as UNIX shell commands, to the shell program 25A via a command line interface. Commands can be entered, for example, to distribute files, directories, software packages, and patches to the target servers 15. Commands can also be entered to edit configuration files of the target servers 15. In addition, commands can be entered to remotely reboot the target servers 15, and stop and start change operation on the target servers 15.

For example, in one implementation, the Unix shell command "ls," which requests a server computer to list a directory of files, may be modified to be used with the user's management system 20 and the virtual server client 30 to list a directory of files from any of the target servers 15. From the user's 10 perspective, the "ls" command is used in the normal manner, except that the user 10 can identify a target server 15 for the command in a path associated with the command. For example, if the target server 15A is named "targetserver1," the user 10 may enter the command "ls//targetserver1/path/" to list the files in the specified path on the target server 15A.

To implement this ls command of the shell program 25A on the user's management system 20, the shell program 25A translates the system calls called by the "ls" command into one or more abstract system calls. These abstract system calls are sent to the virtual server client 30, which in turn sends the abstract system calls to appropriate target servers 15, in this case, the target server 15A. After execution of the command on the target servers 15, the results are communicated back to the user 10 via the application programs 25 and the virtual server client 30.

Other programs can be made "network aware". For example, in some implementation, script interpreters, such as interpreters for the Perl and Python scripting languages can be modified to work with the virtual server client 30. Generally, selected system calls made by an application program are translated into abstract system calls, which are communicated through the virtual server client 30 to the servers 15.

In addition to providing shell commands and other application programs, the management system 20 may include a configuration manager 25B. In one embodiment, the configuration manager 25B is used to configure one or more of the servers 15. The configuration manager is a software application program that implements server change operations that are in turn translated into the corresponding operating system specific commands on the target servers 15.

In one implementation, an application program 25 directs abstract system calls to specific target servers 15. In another implementation, the application program 25 can also direct abstract system calls to a group of servers. A group of servers can be pre-defined or dynamically defined based on attributes such as operating systems, capacity, IP address ranges, and installed applications. For example, the application program 25 can direct an abstract system call to a group of servers, consisting of a subset of servers 15 running the Linux operating system. Application program 25 thus can deploy a command onto a server in this group without specifying a particular server in the subset. In this way, the application program 25 does not need to keep track of each server, not determine which servers have sufficient capacity or features to run the program; rather, the application program 25 can deploy commands (or change operations) to a predetermined group, and the virtual server client 30 decides which specific server should run these operations.

The virtual server client 30, which may be included in the management system 20, presents the servers 15 to the application programs 25 as a single "virtual server" on which system call operations can be executed. The virtual server client 30 is implemented by a software library, which in one implementation is roughly analogous to the C library, libc. The application programs 25 can be statically or dynamically linked to the virtual server library, which is called libnc. In one embodiment, non network-aware application programs 25 are converted to network-aware programs by replacing calls to the libc library with equivalent calls to the libnc library, which provides abstract network-aware system calls.

In an alternative embodiment, the virtual server client 30 may be implemented as part of an operating system. For example, the operating system running the user's management system 20 can receive abstract system calls and communicate them to the remote target servers 15. Accordingly, for purposes of executing an abstract system call a target servers 15, the source of the abstract system call is immaterial.

In some embodiments, the virtual server client 30 communicates with the servers 15 through virtual server agents 35 associated with the servers 15, which will be described in detail below. The virtual server client 30 communicates with virtual server agents 35 to present the multiple physical target servers 15 as a single virtual server to the application programs 25. As an abstract representation of a collection of the physical servers 15, the virtual server intercepts the abstract system calls via the virtual server client 30 and routes the abstract system calls to the virtual server agents 35.

When the virtual server client 30 receives an abstract system call from an application program 25, the virtual server client 30 checks the abstract system call to determine whether this system call is a local call or a remote call. If the abstract system call is a local call, then the operating system running the management system 20 executes the system call locally. If the abstract system call is determined to be a remote call, the virtual server client 30 sends the abstract system call to a virtual server agent 35 associated with a target server 15 via a message protocol. For example, when an "ropen" abstract system call, representing a remote file open command, is received by the virtual server client 30, the data representing the "ropen" command and parameters associated with the "ropen" command are sent to appropriate virtual server agents 35. The target-servers 15 for a system call are identified by the user 10 or the application programs 25. The virtual server client 30 identifies the target servers 15 from their virtual server agents 35 and determines where the system call should be directed.

The virtual server agents 35 receive abstract system calls from the virtual server client 30 and prepare the abstract system calls for their associated target servers 15. When the virtual server client 30 determines to which virtual server agents an abstract system call should be directed, each of the virtual server agents 35 receives the abstract system call. As a part of preparing the abstract system call for the associated target servers 15, the virtual server agents 35 provide security measures to ensure that the user 10 is authorized to access the target servers 15, and that the virtual server agent 35 controls the user access, as provided by the associated target server 15. Once the user 10 is authorized, the virtual server agent 35 translates the abstract system call into an operating system specific call directed to its associated target server 15. The target server 15 executes the abstract system call and returns the results back to the virtual server agent 35, which in turn sends the results back to the appropriate application programs 25 via the virtual server client 30.

In one embodiment, the virtual server agents 35 (also referred to as Remote System Call Daemon or RSCD agents) are software modules attached to their corresponding target servers 15. In another embodiment, the virtual server agents 35 are software modules that are not attached to their corresponding target servers 15, but are in communication with their associated remotely located target servers 15.

In some embodiments, instead of acting as a messenger that sends an abstract system call to a specific target server 15, one of the virtual server agents 35 can represent a group of physical servers. Thus, if the same command needs to be executed on multiple servers, these servers can be aggregated into a group, represented by a single virtual server agent 35, so that appropriate system calls can be made to a group of servers simultaneously via that virtual server agent 35.

Generally, abstract system calls may include all types of system calls including file system calls, operating system calls, and the like. An abstract system call typically is implemented as a modification of an analogous standard operating system specific call. For example, the abstract system call "ropen" is analogous to a standard system call "open," which opens a file on a server.

With minor modifications to an application program's source code, any application program can make operating system agnostic abstract system calls. By changing the system calls to abstract system calls, any generic application program can be made into a network aware-application that can operate transparently across servers supporting different operating systems.

In one embodiment, only the system calls that are applicable to all of the target servers 15 can be modeled as abstract system calls. For example, if the target servers 15 include UNIX-based servers, it may not be possible to model a system call to update a registry as an abstract system call, since a registry, which is a Windows specific object, does not exist and has no relevance for UNIX-based server platforms.

Figure 2:
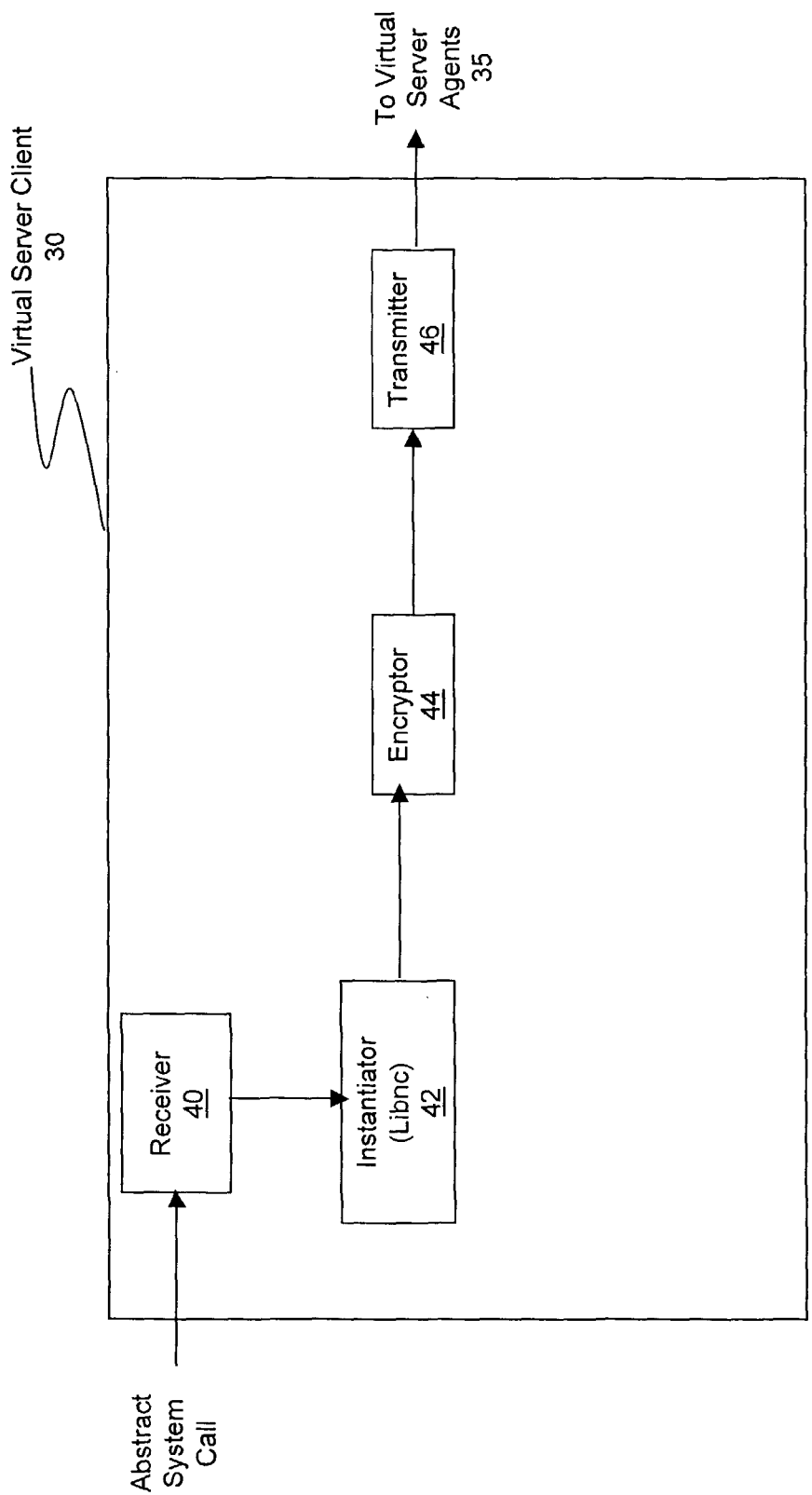
FIG. 2 is a block diagram depicting a virtual server client in accordance with an embodiment of the invention.

Referring to FIG. 2, in one embodiment, the virtual server client 30 includes various software modules which implement its functionality. These modules include a receiver 40 that receives an abstract system call made by an application program 25, and forwards the abstract system call to an instantiator 42. The receiver 40 is a software module that acts a messenger between the software application programs 25 and the instantiator 42. In one embodiment, the receiver 40 receives the abstract system call from one of the software application programs 25 used by the user 10. The receiver 40 then forwards the abstract system call directly to the instantiator 42. In another embodiment, the receiver 40 may receive standard operating system specific system calls from an application program 25. The receiver forwards such standard system calls to the instantiator 42 for the instantiator 42 to decide to where the system calls should be directed.

The instantiator 42 instantiates abstract system calls in a thread-safe manner. The thread-safe instantiation shares a single resource between multiple operations without requiring changes to the architecture of the application programs requesting the operations. Typically, thread-safe instantiation shares the same virtual server client 30 between multiple simultaneous execution of system calls. The use of the shared resource, such as the virtual server client 30, is coordinated, so that the execution of one operation does not impact the execution of other operations. In one embodiment of the thread-safe instantiation, the application programs 25 can instantiate multiple commands (or operations) via the instantiator 42. For example, the application programs 25 may invoke multiple "ropen" system calls that are directed to one or more target servers 15. The "ropen" system call is received by the instantiator 42 in the virtual server client 30. The instantiator 42 then distributes the "ropen" abstract system call to each of the virtual server agents associated with the target servers, so that multiple "ropen" calls can be executed simultaneous by the target servers 15.

In one embodiment, the instantiator 42 is implemented as a software library that provides routines that represent the abstract system calls. One particular implementation of the software library is called "libnc." Libnc is a "network-aware" library that is analogous to the standard C library. The Libnc library supports the network aware application programs 25 by instantiating the abstract system calls generated by the application programs 25.

In one embodiment, the instantiator 42 determines to which virtual server agents 35 an abstract system call should be directed. The instantiator 42 identifies target servers 15 by finding the target server identifiers specified in the abstract system call. The target server identifier may include a path name, which in turn may include a host name or a network address (e.g., IP address) for the server. The target server 15 may also be identified by server names explicitly stated in a file which is to be run on specific named servers. Alternatively, the server identity may be inferred from a subset of servers or a group of servers (e.g., a group of Linux servers) to which the target server 15 belongs.

Before transmitting the abstract system call to the virtual server agents 35, the instantiator 42 can also specify the priority, CPU utilization, and memory utilization of the system call for the target servers 15, so that the identified target server 15 platforms can perform the requested services as specified by the virtual server client 30. Once the abstract system call has been instantiated, it is sent to an encryptor 44 for further processing.

The encryptor 44 encrypts the abstract system call before sending it to a transmitter 46 for transmission to the virtual server agents 35. The encryptor 44 uses standard encryption protocols and algorithms to secure communication between the virtual server client 30 and the virtual server agents 35. Examples of standard encryption protocols include, but are not limited to, SSL (Secure Sockets Layer), Kerberos, and Shared Secret protocols. SSL uses a public key to encrypt data. Kerberos assigns a unique key to each authorized user. Standard encryption algorithm includes, but are not limited to, DES (Data Encryption Standard), 3DES (Triple DES), Blowfish, and AES (Advanced Encryption Standard).

The encryption protocol and algorithm used by the encryptor 44 must be supported by each virtual server agent 35 with which the virtual server client 30 will communicate. For example, if the virtual server client 30 supports SSL, the virtual server agent 35 must be able to support SSL for that protocol to be used. If the virtual server client 30 supports Kerberos, the virtual server agent 35 must also be able to support Kerberos for that protocol to be used.

The transmitter 46 uses a network interface protocol, such as TCP/IP or Ethernet, to send the abstract system call over a network to the virtual server agents 35. The transmitter transmits the same abstract system call to each target virtual server agent. In one embodiment, the transmitter 46 uses an IP address to determine to which of the target servers 15 an abstract system call should be sent. An IP address may be directly included in the abstract system call or may be inferred from a server identifier included in the abstract system call. The virtual server agent 35 accepts the abstract system call containing the IP address of the target server 15 associated with that virtual server agent 35. Once the virtual server agent 35 receives the abstract system call, the virtual server agent 35 processes the abstract system call for execution on the target server 15.

Figure 3:
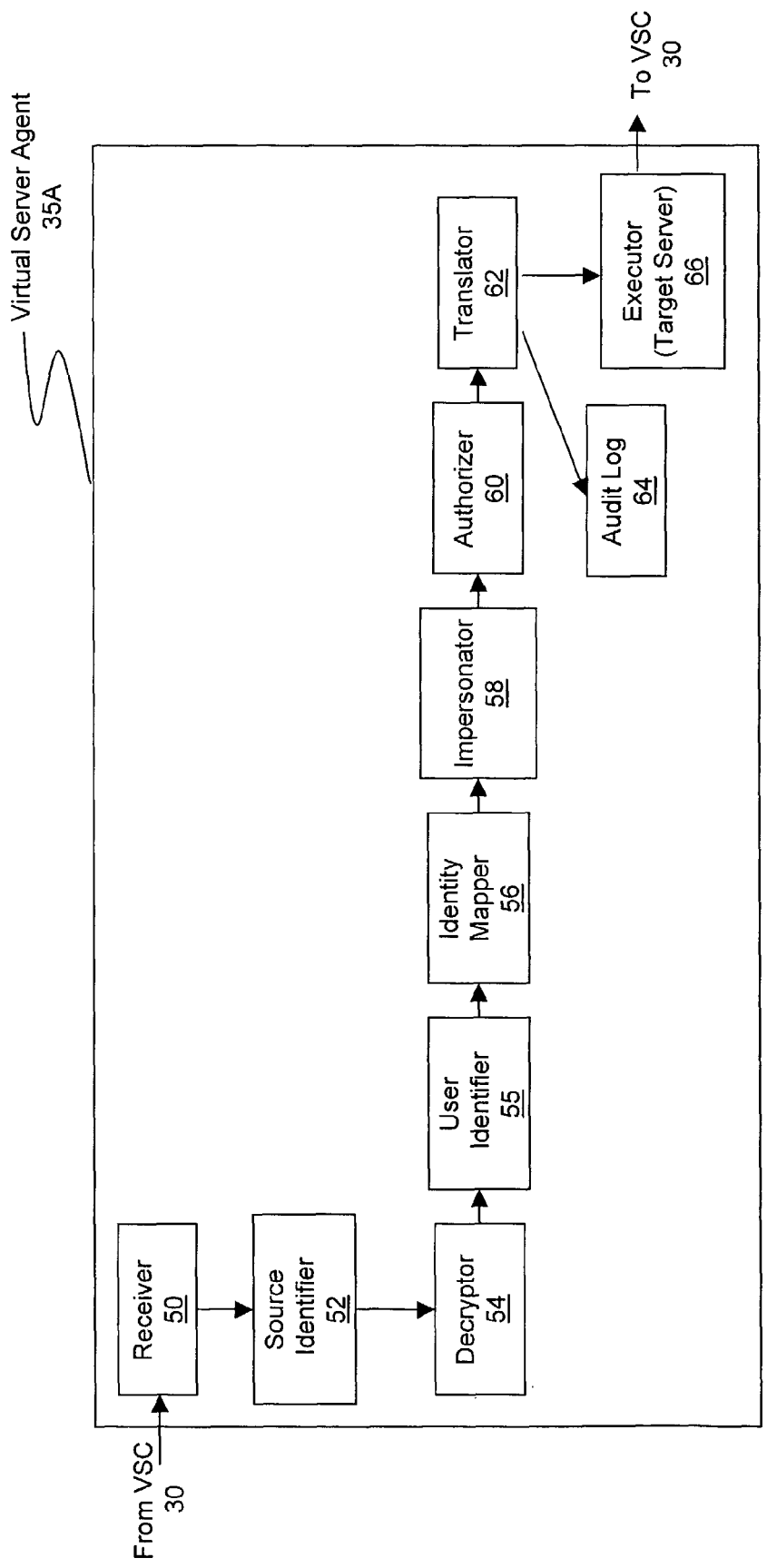
FIG. 3 is a block diagram depicting a virtual server agent in accordance with an embodiment of the invention.

Referring to FIG. 3, each virtual server agent 35 includes software modules that implement its functionality. These modules include a receiver 50, which receives abstract system calls from the virtual server client 30, and transfers the abstract system calls to a decryptor module 52.

Before the user 10 can access the user's management system 20, the user 10 is authenticated to ensure that the user 10 is in fact the person he or she claims to be. The user 10 can be authenticated in many ways. In one embodiment, the user 10 is authenticated by the operating system of the management system 20 and the target servers 15 subsequently inherit the user's 10 identity. In another embodiment, SRP (Secure Remote Password) or PKI Cryptography (X.509 Certificates) is used to authenticate user 10. In yet another embodiment, the Kerberos 5 system can be used to authenticate the user 10 by assigning a unique private key to the user 10.

The source identifier module 52 identifies the source machine, e.g., the user's management system 20. The source identifier module 52 first determines the source machine through a network address (e.g., IP address) that was submitted to the virtual server agent 35 from the virtual server client 30 with the abstract system call and checks to see if the source host is authorized.

By identifying the source machine, the source module 52 determines the security protocols to be used by the virtual server agent 35 for encryption and decryption. In one embodiment, the virtual server agent 35 can support different security protocols. For example, the virtual server agent 35 can flexibly support either SSL or Kerberos based on the security protocol of the incoming data from the virtual server client 30. Next, the abstract system call is sent to a decryptor 54, which decrypts the abstract system call. From the decrypted abstract system call, the user identifier module 55 identifies the user 10 invoking the application programs 25 from the source machine and verifies that the user 10 is authorized to access the source machine.

After the user is identified by the user identifier 55, an identity mapper 56 and an impersonator 58 provide additional security measures as the user 10 tries to access the remote target servers 15 from the user's management system 20. The identity mapper 56 optionally maps the authenticated user (presented user) to another user (effective user) and locates a local user identity on the target server 15 that corresponds to the authenticated identity of the effective user. Through the impersonator 58, the user 10 is impersonated on a remote target server 15, so that if the effective user is identified and exists as a local user on the remote target server 15, the user 10 takes on the local identity of the effective user and the permissions provided by that identity on the remote target server 15. Thus, the user's 10 access to the remote target server 15 is further restricted to the appropriate levels provided by the permissions granted to the effective user's local identity on the remote server 15. For example, if the user 10 is authenticated as "Joe" on the management system 20 and mapped to an effective user "Jane", local permissions of "Jane" will be available to the user 10 on the remote target server 15. If "Jane" does not exist on the remote target server 15, then the user 10 will be given a guest account. In one embodiment, the combination of the presented user and the role, which is defined by Role Based Access Control (RBAC), is mapped to an effective user. For example, user "Joe" having the role of a junior administrator can be mapped to an effective user named "junior administrator." Another user "Bob" also having the role of a junior administrator can be mapped to the same effective user named "junior administrator."

The effective user's access for presented user 10 is further restricted by an authorizer 60, which permits the user 10 to perform predetermined actions or access predetermined resources on a particular target server 15. This is achieved by using Access Control Lists (ACLs) to manage the effective user's access to resources on the remote target servers 15. The ACL informs the operating systems of the remote target servers 15 of the access rights of the effective user on specific server resources, such as files or directories. For example, if the user 10 is mapped to the effective user "junior administrator", then the user 10 is only permitted to perform read-only commands on certain directories or files of a group of remote target servers 15 and cannot effect any changes to the target servers 15.

After the user is authorized, a translator 62 translates the abstract system call into a standard operating system call that is understandable and executable by the target server 15. The translator 62 examines the abstract system call and identifies a standard operating system specific system call that is analogous to the abstract system call and is supported by the operating system running the associated target server 15. Once the analogous standard system call is identified, the translator changes the abstract system call to the standard system call. This standard operating system call is forwarded to an executor 66 for execution on the target server 15.

Once the executor 66 receives a standard operating system call, the executor 66 performs the services that are requested by the standard system call. In one embodiment, the executor 66 is the operating system running on the target server 15. The operating system examines system calls and carries out the operations requested by the system call by, for example, communicating with other applications running on the target server 15.

An audit log 64 is maintained by each virtual server agent 35 to keep track of the names of the users and all the activities performed by each user, and to troubleshoot server changes and configuration errors. For example, the audit log 64 saves information about the activities requested and performed by authorized users, information about data, such as the system calls and the results of the system calls, that were transferred back and forth between the virtual server client 30 and the virtual server agent 35, as well as all parameters associated with the abstract system call. The content of the audit log 64 is then transmitted to a centralized aggregated log kept for all of the virtual server agents 35.

A first example of security measures incorporated in an embodiment of the virtual server implementation follows. First, the user 10 logs into the management system and is authenticated as "Joe" during the login process. This authentication process can be achieved by using a known network authentication server, such as NTLM, K5, AD, APM, NIS, etc., depending on the operating system running on the management system 20. After the user "Joe" is authenticated in the management system 20, the user "Joe" is authenticated for the target servers 15 by inheriting the user "Joe" identity through the management system 20.

Next, the user 10 enters a "ls" command, requesting a listing of files on the remote target server 15A, through the shell command program 25A on the management system 20. The shell command program 25A generates an abstract system call in response to the command and sends the abstract system call to the virtual server client 30 to proceed with the user's 10 request. The virtual server client 30 examines the security configuration of the abstract system call and encrypts the system call using a shared secret key scheme with a encryption algorithm, such as DES, 3DES, or Blowfish. Once the abstract system call is encrypted, the system call is communicated across a network to the virtual server agent 35A of the target server 15A.

When the virtual server agent 35A receives the abstract system call, the target server's 15A agent 35A attempts to decrypt the message using the secret key shared with the virtual server client 30. The virtual server agent 35A checks to see if the user "Joe" is recognized as a local user on the target server 15A through an effective user. If the user "Joe" is recognized as a local user, then the virtual server agent examines the access control list to determine if the combination of the user "Joe" 10, target server 15A, and the abstract system call is allowed. If the combination is allowed, then the access control list is used to determine whether any further restrictions apply to the user's 10 access to the target server 15A. The virtual server agent 35A executes the system call in accordance with any security restrictions, encrypts the results using the same-shared secret key. The results of the "ls" command are sent back to the virtual server client 30, where they are decrypted and displayed to the user.

In a second example of security measures incorporated in an embodiment of the virtual server, the user 10 is authenticated using of SRP or PKI Certificates. Once the user 10 is authenticated the user 10 enters an "ls" command, requesting a listing of files on the remote server 15A, through the shell command program 25A on the management system 20. The shell command program 25A generates an abstract system call in response to the command and sends the abstract system call to the virtual server client 30. The virtual server client 30 examines the security configuration of the abstract system call and encrypts the abstract system call using public key cryptography, standard encryption algorithms, such as DES, 3DES, or Blowfish, may be used for exchange of session key between the virtual server client 30 and the target server agent 35A to establish a communication session between them.

After decrypting the abstract system call received by the virtual server agent 35A, the virtual server agent 35A checks to see if the user "Joe" is recognized as a local user on the target server 15A through an effective user. If the user "Joe" is recognized as a local user, then the virtual server agent 35A examines the ACL to determine if the combination of the user 10, target server 15A, and the abstract system call is allowed. If the combination is allowed, then the access control list is used to determine whether any further restrictions apply to the user's 10 access to the target server 15A. The virtual server agent 35A executes the system call in accordance with any security restrictions, and encrypts the results using the established session key. The results of the "ls" command are then sent back to the virtual server client 30, where they are decrypted and displayed to the user.

A third example of security measures incorporated in an embodiment of the virtual server implementation follows. If the management system 20 has an existing Kerberos 5 (K5) infrastructure in place, the user 10 can be authenticated by entering a Kerberos password to the management system 20. Once the user 10 is logged in as the authenticated user "Joe," the user 10 enters the "ls" command, requesting a listing of files on the remote target server 15A, through the shell command program 25A on the management system 20. The shell command program 25A generates an abstract system call in response to the command and sends the abstract system call to the virtual server client 30 to proceed with the user's 10 request. The virtual server client 30 then sends the abstract system call and a Kerberos ticket, which is retrieved from a Kerberos Domain Controller (KDC) to the virtual server agent 35A.

After the virtual server agent 35A receives the abstract system call and the ticket, the virtual server agent 35A validates the abstract system call by verifying the ticket via the IDC. Once validated, the virtual server agent 35A checks to see if the user "Joe" is recognized as a local user on the target server 15A through an effective user. If the user "Joe" is recognized as a local user, then the virtual server agent examines the ACL to determine if the combination of the user "Joe" 10, target server 15A, and the abstract system call is allowed. If the combination is allowed, then the access control list is used to determine whether any further restrictions apply to the user's 10 access to the target server 15A. The virtual server agent 35A executes the system call in accordance with any security restrictions, encrypts the results using a Kerberos key. The results of the "ls" command are sent back to the virtual server client 30, where they are decrypted and displayed to the user.

Figure 4:
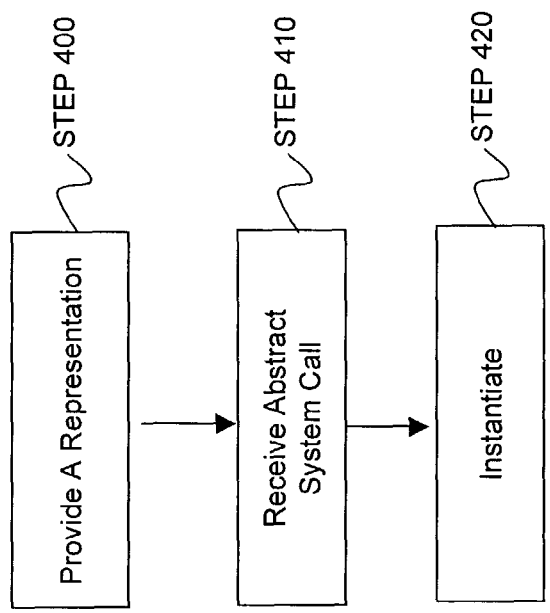
FIG. 4 is a flowchart depicting an embodiment of a method for receiving and executing a system call from an application program.

Referring now to FIG. 4, a method for managing multiple servers as a single virtual server is described. First, in step 400, the system represents multiple servers as a single virtual server. Next, in step 410, based on a user's request for operations to be performed on target servers, the virtual server client 30 receives an abstract systems call from an application program 25. Finally, in step 420, the virtual server client instantiates the abstract system calls and sends the abstract system call to the virtual server agents 35 for execution.

Figure 5:
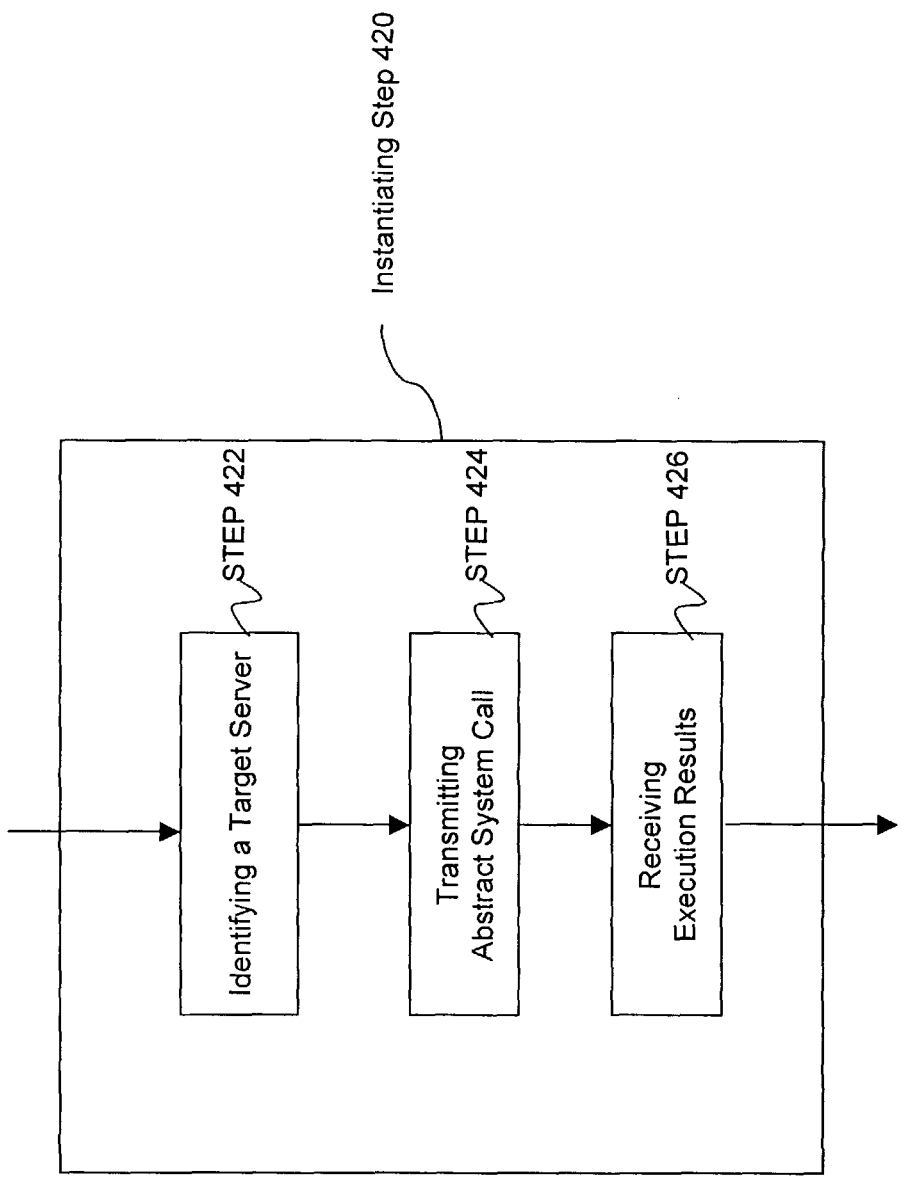
FIG. 5 is a flowchart depicting the details of instantiating an abstract system call in one embodiment of the method of FIG. 4.

FIG. 5 shows steps involved in instantiating an abstract system call. First in step 422, the virtual server client 30 identifies the target servers 15 through target server identifiers provided within the abstract system call. Once the target servers are identified, in step 424, the abstract system call is transmitted to the virtual server agents associated with the identified target servers. The virtual server agents 35 prepare the abstract system call for the target servers 15, so that the abstract system call can be the executed on the target servers 15. For example, for the target server 15A, the abstract system calls are translated into standard MICROSOFT WINDOWS NT/W2K specific system calls that are executable by the operating system running on the target server 15A. Upon completion of execution of the system call, in step 426, the virtual server client 30 receives the results of the execution from the virtual server agents 35.

In one embodiment, multiple commands generate multiple system calls, which can be aggregated into a single high-level abstract system call by an application program 25. For example, if two commands, such as copy and change permission commands, are to be made to a target server 15A, the abstract system calls carrying out these commands, such as ropen, rread, rwrite, and rchmod system calls, can be aggregated into one high-level abstract system call. When received by the virtual server client 30, the virtual server client 30 can disintegrate the high level abstract system call into the original abstract system calls and transmit the abstract system calls separately to virtual server agent 35. In another embodiment, instead of disintegrating the high-level system call into the original abstract system calls at the virtual server client 30, the high-level abstract system call is received by a virtual server agent 35, which in turn translates the high-level abstract system call into separate operating system specific system calls to be executed on the target server 15.

Figure 6:
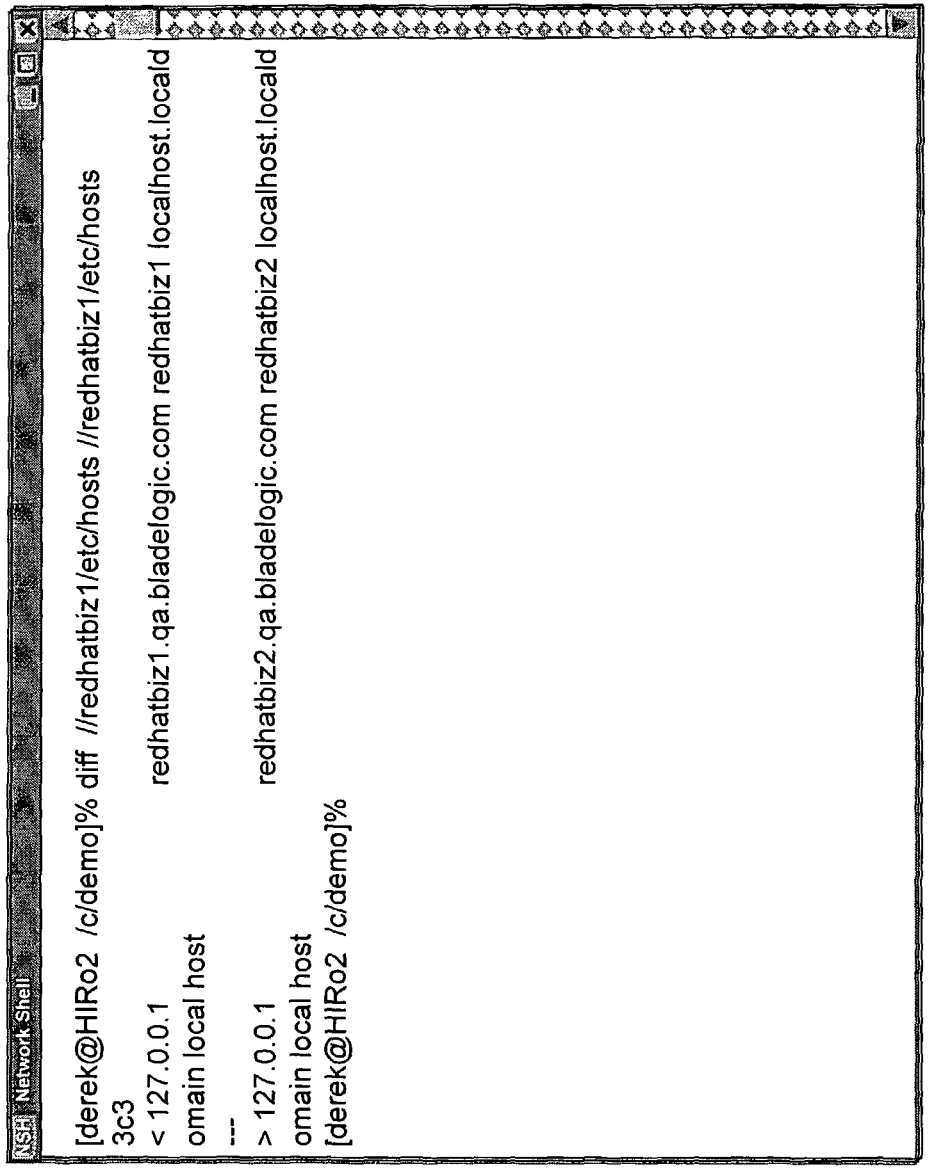
FIG. 6 is a screen shot of an embodiment of a system implementing the method of FIG. 4.

FIG. 6 is a screenshot showing a command being issued to multiple servers through the management system 20. As shown here, server names used as parameters for commands are preceded by two slashed to distinguish them from a path name, which is generally separated by a slash. For examples, "//redhatbiz1/etc" specifies the/etc path on the server named "redhatbiz1." Thus, as seen in the screenshot, to compare the "/etc/hosts" file on two different servers, one named "redhatbiz1," and the other named "redhatbiz2," the user 10 enters the command "diff//redhatbiz1/etc/hosts//redhatbiz2/etc/hosts."

Referring back to FIG. 1, in an alternative embodiment, the user 10 manages the target servers 15 by executing and undoing distributed server change operations across the target servers 15 in a transaction safe-manner, using the virtual server implementation described above. Distributed server change operations request the operating systems of the target servers 15 to update, delete, install, and/or copy server assets and/or configuration file entries of the target servers 15. Transaction-safe server change operations ensure that all of the required steps of each server change operation are completed before the distributed server change operations are deemed completed. Further, if an error occurs while performing the required steps on the target servers 15, any changes made from these steps are undone, and values of the target servers' 15 assets and/or configuration entries are returned to the values they had before execution of the server change operations. In one embodiment, the application programs 25 can generate a transaction package that bundles an instruction set and necessary server contents for the operating system of each of the target servers 15 to carry out the server change operations.

Figure 7:
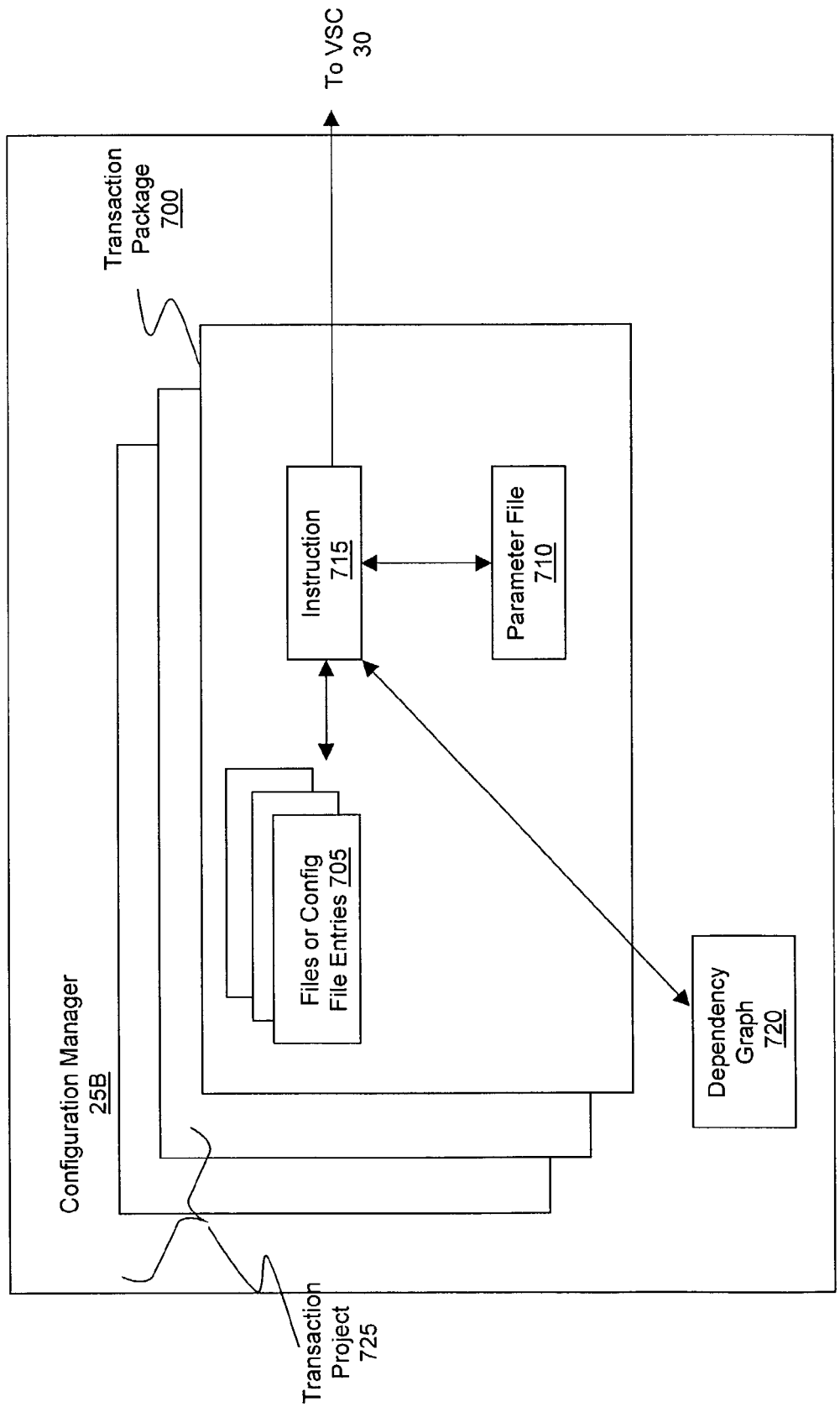
FIG. 7 is a block diagram depicting an embodiment of a system for executing and undoing distributed server change operations in a transaction-safe manner.

Referring to FIG. 7, in one embodiment, the configuration manager 25B generates a transaction package 700 that includes files or configuration file entries 705 (together referred to as server objects), a parameter file 710, and an instruction set 715 to carry out the server change operations on one or more target servers 15 that are specified by an external file, as requested by the configuration manager 25B.

In one embodiment, the instruction set 715 includes an execution sequence of the server change operations provided for the operating systems of the target servers 15 that carry out the server change operations. If this information is not provided in the instruction set 715 in the transaction package 700, an external dependency graph 720 is accessed to provide an execution sequence of the server change operations. For example, the external dependency graph 720 can provide information about directional relationships between server objects. In particular, if NT-based program A is a prerequisite for another NT-based program B, to successfully execute programs A and B, program A must start before program B and program B must stop before program A. Although the sequence information is used to order the sequence of change operations for the server objects that are specified in the transaction package, the sequence information is also used to add implied server object change operations for related server objects, such as server objects that depend on and/or depend from these specified server objects, that are not specified in the transaction package. In particular, continuing from the previous example, if the only change instruction provided in a transaction package is to stop program A, the sequence information adds the implied instruction to stop program B and then stop program A based on the directional relationship between programs A and B. Thus, the sequence information from the dependency graph determines the sequences of server change operations to be performed not only on the specified server objects, but also on their related server objects. If an error occurs while performing the service change operations, the sequence information also causes the server change operations to stop and to be reversed not only on the specified servers, but also on the related server objects.

As described above, if the instruction set 715 provides the sequence information for the server change operations, the instruction set 715 overrides the sequence information provided by the dependency graph 720. Similar to the sequence information provided by the dependency graph 720, the instruction set 715 provides the information related to the order in which the server change operations should be performed. The related server objects of the specified server objects are provided, so that the server change operations can effect changes on the related server objects, as well as the specified server objects. The instruction set 715 also provides dependency information between types of servers. For example, if an application server depends on a database server, the sequence information provided in the instruction set 715 will instruct the execution of the database server change operations before the execution of the application server change operations.

In one embodiment, the instruction set 715 specifies server change operations to occur on any of the four types of server objects 705: primitive server objects, compound server objects, abstract configuration server objects, and component server objects. A primitive server object is an elemental server object that serves as a basis for all other types of server objects. For example, for Linux-based servers, primitive server objects include, but are not limited to, files, directories, Redhat Package Manager files, and configuration file entries for text configuration files, such as the "inetd.conf" file. For Solaris-based servers, primitive server objects include, but are not limited to, files, directories, packages, patches, and configuration files entries for configuration files, such as the "inetd.conf" file. For MICROSOFT WINDOWS NT or W2K-based servers, primitive server objects include, but are not limited to, files, file ACLs, directories, directory ACLs, application programs, hot fixes, the registry entries, registry entry ACLs, COM/COM+ (component object model) catalog entries, Metabase entries, users, accounts, and configuration file entries for all configuration files, such as ".ini" files.

A compound server object is a server object containing primitive server objects and other related compound server objects. For example, an extended component object model (COM+) object, an NT or W2K-based compound server object, contains primitive server objects, such as a COM+ catalog entry, NT registry entries, and DLL files. In yet another example, an Enterprise JavaBeans (EJB) object, a compound server object, contains primitive server objects including a Java Archive (JAR) file and multiple configuration file entries. In another example, a server process is a compound server object, containing primitive server objects, such as configuration file entries (e.g., a permission entry, a priority entry, a control signal entry), files, and executables.

An abstract configuration server object is a special type of a primitive server object that represents an entry in a configuration file via a corresponding entry in an abstract configuration file, where mapping of a configuration file to a common abstract configuration format is provided by a configuration file-specific grammar. For example, in the MICROSOFT WINDOWS NT/W2K environment, configuration file entries are stored in ".ini" files or XML configuration files. In the UNIX environment, configuration file entries are stored in text files such as "inetd.conf" files or "httpd.conf", or XML configuration files.

To reconcile the difference between the configuration file entry formats across different servers, a common abstract configuration format is provided by normalizing configuration file entries through a supported configuration file-specific grammar. By modeling each configuration file entry as an abstract configuration file entry through this normalization process, server change operations may be made based on the normalized abstract configuration file entries. The change operations requested by the abstract configuration file entries are performed, and the changes are then communicated to the actual configuration file entries. Thus, in this embodiment, configuration file entries can be individually managed through use of abstract configuration file entries, without having to change the entire configuration file each time a server change operation changes an individual entry. Configuration file-specific grammars may be provided for numerous systems, including SOLARIS, LINUX, MICROSOFT WINDOWS NT4/W2K, Apache, WEBLOGIC, and WEBSPHERE.

A component server object is a sequenced collection of server objects. For example, an NT Service Pack is a sequenced collection of NT Hot Fixes to be applied in a predefined order. Accordingly, a collection of predefined related change operations can be effected in order through a component server.

In addition to the constituencies of the instruction set 715 described above, the instruction set 715 specifies the server change operations to be made across the target servers 15 on a collection of predetermined server objects by communicating with the server objects (e.g., files or configuration file entries 705), the dependency graph 720, and the parameter file 710. Server change operations can be used to deploy or copy files, directories, and software packages to the target servers 15. Change operations can also be used to edit configuration file entries 705 without having to log into each target server 15. In one embodiment, the instruction set 715 provides the information needed by the target servers 15 and their associated virtual server agents 35 to carry out the server change operations. In one embodiment, the instruction set 715 provides a transaction context that is identified by begin-transaction and end-transaction statements encapsulating the server object change operations. After the begin-transaction statement is made, the instruction set provides the necessary information to perform the change operations requested by the application programs 25.

The instruction set 715 also provides error-handling instructions for the target servers and their associated virtual server agents. In one embodiment, several types of errors are available. Soft errors are available to alert the target servers and their virtual server agents of a likelihood of occurrence of an error during server change operations. Because no actual error has occurred, the user 10 may ignore the soft errors and continue with the execution of the server change operations. Alternatively, the user 10 may instruct the virtual server agents to explicitly undo all the changes made from the execution of the server change operations after reviewing the error information returned by the soft errors.

Hard errors are available to notify the virtual server agents of an occurrence of an error during the performance of server change operations on the target servers. In one embodiment, the hard errors can be programmed to automatically trigger undo operations to undo any of the changes made during the execution of the server change operations. In another embodiment, the hard errors can be programmed to abort the execution of the remainder of transaction package change operations. The hard errors are triggered by error conditions set forth in the instruction set 715. These error conditions specify that if certain conditions occur, the hard errors should be sent to the target servers and their associated virtual server agents.

The instruction set 715 also includes prerequisite information for the instructions. An example of this prerequisite information can include, but are not limited to, the minimum set of change operation instructions that must be specified in a transaction package for its successful execution. For example, to successfully add a COM+ component on the target servers, instructions for adding the COM+ entry in the catalog, the corresponding Registry entry, and the corresponding DLL file must be specified in the transaction package. Another example of the prerequisite information can include types of permissions needed to carry out the change operations, minimum disk space required by the target servers 15, and the type of operating system required. In addition, the prerequisite information can also include implicit instructions for hierarchical server objects. For example, to add a file in the target servers, the parent directory for the file should exist in the target servers, so that the file can be created under the specified parent directory in these servers.

In one embodiment, the instruction set 715 defines the changes that need to be made on the server objects by using named parameters, and later replacing the parameters with actual values obtained from a parameter file 710. The virtual server agents 35 receive the transaction package 700 on behalf of their associated target servers 15, and replace the named parameters with values obtained from the parameter file 710. These named parameters are particularly useful when performing server change operations on server objects that are directed to multiple target servers 15, because the named parameter representing the identity of each target server can be replaced with the actual server identifiers by the virtual server agents 35. For example, named parameters of an instruction can reference a path name for a target server 15 that includes a host name or an IP address of the target server 15. These parameters are replaced with actual server identifiers for each target server 15, as provided in the parameter file(s) 710.

In one embodiment, the parameter file 710 can be either a global parameter file or a host-specific parameter file. A global parameter file contains parameters that are configured by the user 10, thus the identical global parameter file is passed to all target servers 15. A host specific parameter file contains parameters that are specific to each of target servers 15, thus the host specific parameter file is different for each of target servers 15. Parameter values contained in the global parameter file are useful when copying the same server object to the same destination on multiple target servers 15. Examples of this type of parameter are the user's name and password. For parameter values contained in the host-specific parameter file, the parameter values are resolved by each of the target servers 15. Examples of these parameters are host names, and path names of the target servers 15. In addition, there are intrinsic parameters that are resolved through host environment variables on the target server. In one embodiment, one or more parameter files 710 are associated with one or more target servers. For example, for a Window-based target server, "windir" and IP address are examples of host environment variables that can be used to resolve intrinsic parameters associated with one or more target servers and passed via the transaction package 700.

Referring to FIGS. 1 and 7, in one embodiment, instead of using abstract system calls to carry out server change operations generated by the application programs 25, a transaction package 700 can be used to carry out these change operations using an XML-based instruction set 715. To accommodate both system call level commands and XML-based instruction sets, each virtual server agent 35 is divided into two parts. One part of the virtual server agent 35 is an XML API that can interpret the XML-based instruction set 715 contained in the transaction package 700, and the other part of the virtual server agent 35 is a system call API that can interpret abstract system calls. Thus, when a virtual server agent 35 receives an XML-based transaction package 700 through the virtual server client 30, the XML-based instruction set 715 in the transaction package 700 can be interpreted via the XML API. In an alternative embodiment, the transaction package 700 can be implemented with a text-based instruction set 715. The commands of the text-based instruction set 715 are translated into abstract system calls that are in turn interpreted by the system call API.

Below is an example of an XML-based transaction package, named "Package_1.XML," specifying a prerequisite, transaction context, compound server object, sequence, and error handling information using an XML-based instruction set 715. Package_1.XML

```
<blpackage schema-version="2.0" created-date="02/12/03" modified-date="02/22/02" revision="23">
<name>
name of the blpackage
</name>
<description>
description of the package
</description>
<source type="host">web-demo1</source>
<!-- default parameters -->
<param name="$APP_PATH"> c:\program files\app </param>
<param-file>foo.params</param-file>
<applies-to>
    <condition>
        <os>"$(os) = Windows"</os>
        <os-version>$ (os-version) > 5</os-version>
        <service-pack>2</service-pack>
    </condition>
</applies-to>
<!-- requires the following items before we deploy this package -->
<depends>
    <condition>
        <application>SQL server</application>
        <version>$(version) = 8.0 </version>
    </condition>
</depends>
<!-- failure conditions if the following exit on target -->
<FailIf>
    <ErrorLevel <4
    />
</FailIf >
<transaction id="0">
    <command id = "1005" undo="net start w3svc">net stop w3svc</command>
    <service action="add" refid="1003" key="RSCDsvc">
        <depends>
            <file refid="1002"/>
        </depends>
    </service>
    <command id = "1006" undo="net stop w3svc">net start w3svc</command>
    <file action="add" key="%WINDIR%ado.dll" refid="1001"/>
    <file action="add" key="%WINDIR%/System32/svchost.exe" refid="1002" />
    <assets>
        <file id="1001">
            <name>ado.dll</name>
            <source>0</source>
            <attributes>2</attributes>
            <created-date>02/12/03</created-date>
            <modified-date>02/22/03</modified-date>
            <owner></owner>
            <group>0</group>
            <acl key="%WINDIR%ado.dll" owner="BUILTIN\Administrators">
                <ace action="add" id="1313">web admins</ace>
                <acemode>0</acemode>
                <aceflags>3</aceflags>
                <acemask>1179817</acemask>
                <ace action="add" id="1314">dbas</ace>
                <acemode>1</acemode>
                <aceflags>3</aceflags>
                <acemask>2032127</acemask>
            </acl>
        </file>
        <file id="1002">
            <name>svchost.exe</name>
            <source>0</source>
            <attributes>2</attributes>
            <created-date>02/12/03</created-date>
            <modified-date>02/22/03</modified-date>
            <owner></owner>
            <group>0</group>
            <acl key="%WINDIR%ado.dll" owner="BUILTIN\Administrators">
```

-continued

```
            <ace action="add" id="1313">web admins</ace>
            <acemode>0</acemode>
            <aceflags>3</aceflags>
            <acemask>1179817</acemask>
            <ace action="add" id="1314">dbas</ace>
            <acemode>1</acemode>
            <aceflags>3</aceflags>
            <acemask>2032127</acemask>
        </acl>
    </file>
    <service id="1003" name="RSCDsvc">
<binary_path>%WINDIR%/System32/svchost.exe</binary_path>
        <name>RSCDsvc</name>
        <description></description>
        <state>Stopped</state>
        <runas>
            <userid>$Token1</userid>
            <pwd>$Token2</pwd>
        </runas>
    </service>
</assets>
</transaction>
</blpackage>
The Parameter file foo.params contains
    $TOKEN1 as a parameter that corresponds to user id -
    "R2D2\web-admins"
    $TOKEN2 as a parameter to password for R2D2\web-admins -
    "c3-po"
```

In this example, the <blpackage schema> tag denotes the beginning of the instruction set 715. The <name>, <description> and <source type> tags respectively provide the package name, description, and source server, in this example "web-demo1," server, from where the package was created. The <param> tag is use to specify location, in this example "c:\program files\app", of parameters having the name of "$APP_PATH" within the package 700, while <param-file> tag is used to specify an external parameter file 710 called "foo.params". In the prerequisite section, which is introduced with the <applies-to> tag, the MS Windows operating system, version greater than 5 and with service pack 2, is specified as a prerequisite to carry out this instruction set. Also in the prerequisite section, the <depends> tag, indicates that SQL Server, version 8, is a pre-requisite for the package. The error handling information, which is introduced with the <FailIF> tag, specifies that the server operations should fail if error level falls below 4.

The <transaction id="0"> tag introduces the set of change operations requested, and any dependency information for the specified server change operations. The execution sequence information for the server change operations is provided under the <depends> tag. In this example, the order of the operations, -stop w3svc, add service RSCDsvc, start w3svc, add file ado.dll, and add file svchost.exe, would occur in the following order: stop w3svc, add file svchost.exe, add service RSCDsvc, start w3svc, and add file ado.dll.

The server assets that are being affected by the server change operations are specified under the <assets> tag. This example has three assets—two files, id=1001 and id=1002, and one service, id=1003. Each file has a corresponding nested File ACL having the <acl key> tags.

The parameter file 710, "foo.params" has two parameters that are used in the transaction package 700, named as "$TOKEN1" and "$TOKEN2". Instead of passing physical values directed to each target server, the named parameters are sent, and are resolved by the parameter file 710 when the parameter file 710 substitutes the actual values that are specific for each target servers 15 for the named parameters. As shown in this example, these values can be a path for a collection of server objects (e.g., files), a user name, or a password. In this example, the first parameter, $TOKEN1, corresponds to the user name "R2D2\web-admins", and the parameter $TOKEN 2 corresponds to the password "c3-po."

In one embodiment, multiple transaction packages can be aggregated into a transaction project 725. The transaction project 725 coordinates the transaction packages 700 and their server change operations, so that each server change operation can be executed in a transaction safe manner. Below is an example of an XML transaction project 725 containing a transaction package named "BLPkg_web.XML," directed to six web servers, a transaction package named "BLPkg_app.XML," directed to two application servers, and a transaction package named "BLPkg_db.XML," directed to two database servers:

```
<PROJECT>
    <BLPkg>
        <Name>BLPkg_web.XML</Name>
        <Hosts>Web Server1</Hosts>
        <Hosts>Web Server2</Hosts>
        <Hosts>Web Server3</Hosts>
        <Hosts>Web Server4</Hosts>
        <Hosts>Web Server5</Hosts>
        <Hosts>Web Server6</Hosts>
    </BLPkg>
    <BLPkg>
        <Name>BLPkg_app.XML</Name>
        <Hosts>App Server1</Hosts>
        <Hosts>App Server2</Hosts>
    </BLPkg>
    <BLPkg>
        <Name>BLPkg_db.XML</Name>
        <Hosts>Db Server1</Hosts>
        <Hosts>Db Server2</Hosts>
    </BLPkg>
</PROJECT>
```

In this example, first, the package "BLPkg_web.XML" is to be executed on six web servers named Web Server1 through Web Server6, the package "BLPkg_app.XML" is to be executed on two application servers, and the package "BLPkg_db.XML" is to be executed on two database servers.

Figure 8:
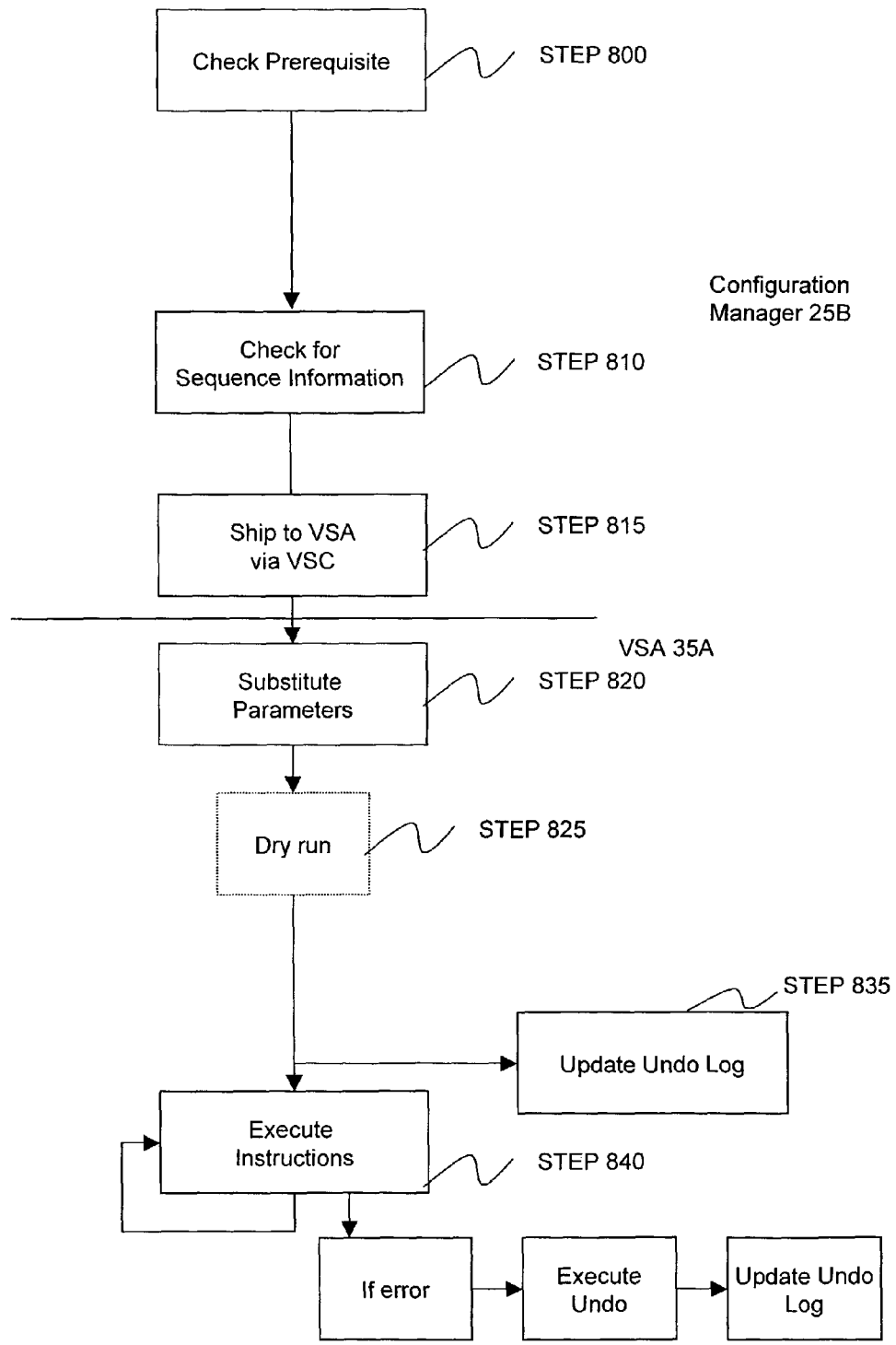
FIG. 8 is a flowchart depicting an embodiment of a system for executing and undoing distributed server change operations in a transaction-safe manner.

The configuration manager 25B, or any of the application programs 25, prepares the transaction package 700 and instructs the virtual server client 30 to pass the package 700 to the virtual server agents 35 associated with the target servers. After receiving the transaction package 700, the virtual server agents 35 unpack the package 700 and execute the operations on their associated target servers 15. A method for achieving this is shown in FIG. 8

In Step 800, Configuration manager 25B checks the prerequisite information of the requested change operations. Examples of the prerequisite information include checks related to integrity and completeness of package such as prompting for user name and password if required, making sure simple dependencies are resolved, and making sure the corresponding files are in the package.

After the prerequisites are checked in step 800, in step 810, the configuration manager 25B checks for the sequence information setting forth the execution order of the requested change operations in the package's instruction set 715. If the sequence information is not provided in the instruction set 715, the configuration manager 25B accesses the external dependency graph 720 to obtain the sequence information. After completion of step 810, in step 815, the configuration manager 25B transfers the package 700 and the associated files and parameter files to the virtual server agents 35 via the virtual server client 30.

In one embodiment, the virtual server agent 35 receives the completed transaction package 700 via the virtual server client 30. On the virtual server agent 35, in step 820, the named parameters are substituted with actual values. The virtual server agent 35 then executes the server change operations specified in the transaction package for its associated target server 15. In another embodiment, instead of transporting the completed transaction package 700, the virtual server client 30 may transport only the parameter file 710 and the instruction set 715, without the actual files or any of the server objects, to the virtual server agent 35, in case the user 10 optionally elects to proceed with a dry run. The dry run provides an additional set of tests to see if the instruction set 715 can be carried out by the recipient virtual server agent 35 before making any changes on the target server 15. After the virtual server agent 35 receives a partial transaction package 700 from the virtual server client 30, in step 820, the parameters are substituted with actual values as provided in the parameter file 710. After completing the dry run, the configuration manager 25B can transfer the entire package 700 to the virtual server agents 35 via the virtual server client 30 for actual execution.

Before executing the operations on each target server 15, in step 835, the agent updates an undo log. The undo log, which is maintained for each target server, records the executed operations, and tracks the changes made by these operations, so that if an error occurs while executing the servers change operations, the operations can be undone as recorded in the undo log. This can be achieved by tracing back the steps performed during the server change operations using the undo log records. In one embodiment, the undo log is identical in structure to the transaction package, but with the parameter files arranged in reverse order and the change operations recorded in reverse order. Finally in step 840, the server change operations are executed on the target servers 15.

Figure 9:
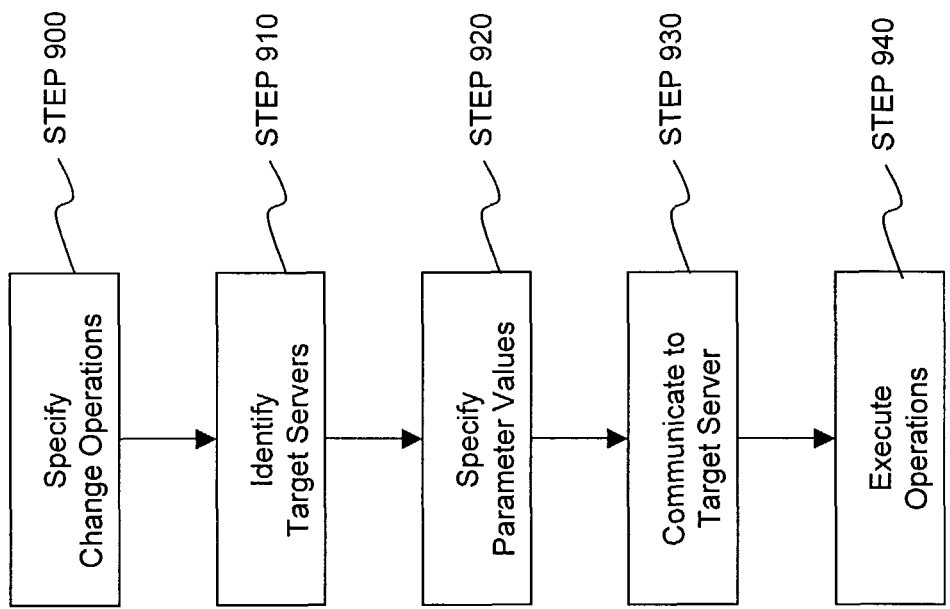
FIG. 9 is a flowchart depicting an embodiment of a method for executing and undoing distributed server change operations in a transaction-safe manner.

Referring now to FIG. 9, a method for executing and undoing server change operation in a transaction safe manner is described. In step 900, one or more application programs 25 generate and specify change operations using a transaction package 700. Different types of server objects and corresponding target servers 15 are supported through the instruction set provided in the transaction package 700. Next, in step 910, the application program specifies the target server(s) to which the server change operations are directed. In step 920, the application program specifies the parameter file that provides parameters and their corresponding values defined for each of the target servers, and places this information in the transaction package 700. In step 930, the server client 30 sends the server change operation from the application program 25 to the virtual server agents 35 on the target servers 15. In step 940, the target servers 15 execute the server change operations in a transaction-safe manner.

Configuration Manager

Figure 10:
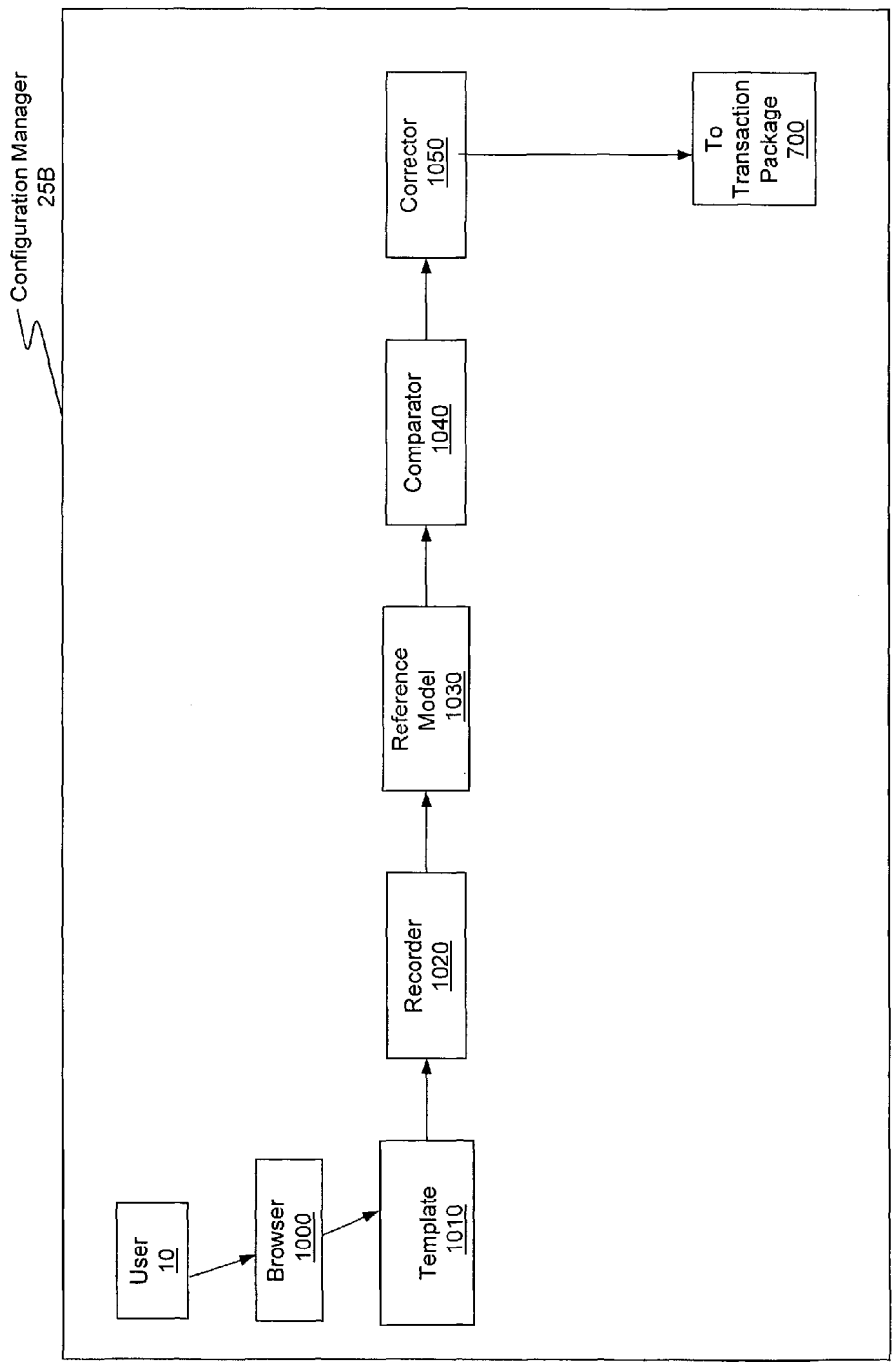
FIG. 10 is a block diagram depicting an embodiment of a system for configuring multiple servers in a heterogeneous computing environment.

Referring now to FIG. 10, the configuration manager 25B is an exemplary application program 25 that tracks changes and compliance and configures target servers by generating and deploying a transaction package 700. The configuration manager 25B provides a method and system for configuring different servers using a variety of software modules, such as a browser 1000, a template 1010, a recorder 1020, a reference model 1030, a comparator 1040, and a corrector 1050.

The browser 1000 browses server objects in different servers in real time, to examine the current configuration of the server objects contained inside of the servers 15. First, the user selects a server he/she wishes to browse. Through browsing, a collection of server object identifiers that identify each server object are selected and entered into the template 1010.

Alternatively, instead of building the template 1010 from browsing, the template 1010 may be imported from an external vendor. The template 1010 may also be created by including one or more previously defined templates. In one embodiment, the template 1010 is an abstract template that identifies server objects contained in a server. For example, if an Apache server contains files, and configuration file entries, an Apache server template 1010 contains identifiers that are sufficient to identify the files and configuration file entries of the Apache server. After identifying server objects on the template 1010, values of these identified server objects are recorded to configure servers on the network.

In one embodiment, the recorder 1020 takes a snapshot of values (e.g., attributes) associated with a collection of server objects. In another embodiment the recorder 1020 takes a snapshot of values of the server objects identified in the template 1010. The values may come from any of the servers browsed by the browser. Alternatively, the values may come from a selected server, also referred to as a gold server. Examples of the values (or attributes) of files recorded in the snapshots include, but are not limited to, file names, sizes, permissions, owners, creation dates, modification dates, and versions. Examples of directory attributes (or values) recorded in snapshots are directory locations, permissions, creation dates, and modification dates. Examples of registry entry attributes recorded in snapshots are field names, and corresponding values.

In one embodiment, the recorded values or snapshot results of the gold server are used to derive baseline values and compliance ranges in the reference model 1030. In another embodiment, instead of creating the reference model, the snapshot results can be directly used to track changes, configure existing servers and provision new servers on the network. Snapshot results record a configuration of a server at a point in time, thus they cannot be changed. However, the reference model 1030 can be edited to represent the reference implementation for compliance or provisioning purposes.

For example, when the snapshots of the gold server are taken by the recorder 1020, the values collected in the snapshots are saved in the reference model 1030. Based on the values of the gold server, the reference model 1030 can provide information, such as baseline values and compliance ranges, for use by other servers in the network to identify their drift in comparison to the gold server. The baseline values provide basis for configuration of other servers. The compliance ranges are ranges of acceptable configuration values that are acceptable for other servers for these servers to be in compliance. Alternative to creating a reference model 1030, the reference model 1030 may be an imported reference model that was created by an external vendor. Also, the reference model 1030 may include one or more previously defined reference models. Subsequently, the comparator 1040 compares a server to the reference model 1030 to track changes and track compliance in the server.

In another example, a snapshot of a current configuration of a server captured at an arbitrary point in time can be compared against a live-version of the captured server to track changes in the captured server. The configuration of a server can include explicitly selected server objects that are on the server or implicitly selected server objects provided through the template 1010.

In yet another example, the snapshot results of recurring snapshots of a server taken at scheduled time intervals (e.g., daily, weekly, etc.) can be used to track changes in the captured server. In this example, the first snapshot of the server serves as a baseline, so that for subsequent snapshots, only the changes against the baseline are saved in the snapshot results.

Thus, any snapshot result taken during these time intervals can be reconstructed to view its entire configuration and content by combining the baseline with the incremental changes saved in the snapshot result. Moreover, the incremental changes show changes occurred in the configuration of the server over a period of time for the user to analyze the changes of this particular server. Subsequently, the comparator 1040 compares a live-version of the server to the baseline snapshot to track and save only changes on the server.

In one embodiment, two live servers can be compared against each other without the snapshots or the reference model 1030, on an ad-hoc basis. In this embodiment, the user 10 may explicitly select server objects that are commonly shared between the two live servers so that the comparator 1040 can compare the values of the sever objects between these servers. In another example of this embodiment, the comparator 1040 compares the values of the server objects that are implicitly provided by the template 1010.

After comparing the servers and identifying the discrepancies present in the compared servers, the corrector 1050 corrects the discrepancies in each target server. The corrector 1050 examines the discrepancies and generates server change operations that request services from the operating systems running on the target servers to correct these discrepancies. As described previously, server change operations can be presented to the servers as a transaction package 700 to remove discrepancies and synchronize the target servers to the reference model 1030 in a transaction-safe manner. Similarly, in one embodiment, configuration updates to the target servers can be made by the transaction package 700. In particular, the configuration manager 25B first makes all the updates to the reference model 1030, which then packages the discrepancies (introduced in the reference model) as updates in the transaction package 700. The transaction package 700 is propagated to the target servers to synchronize them to the updated reference model 1030.

The reference model 1030 can also be used to provision a new server to ensure consistency in the configuration of the servers in the network when a new server is added. For example, an Apache reference model 1030 can be used to provision a new Apache server so that the configuration of all Apache servers in the network are consistent with each other.

In addition, both the reference model 1030 and snapshots can be used restore a previous configuration of a server in case of a disaster recovery. In particular, in case of a server failure, this server can recover its most recent configuration and contents by reconstructing the server's configuration from the snapshots taken over a period of time. With the reference model 1030, in case of a server failure, the server can look to the basis values of the gold server in the reference model 1030 and synchronize to this configuration to be in compliance again.

Figure 11:
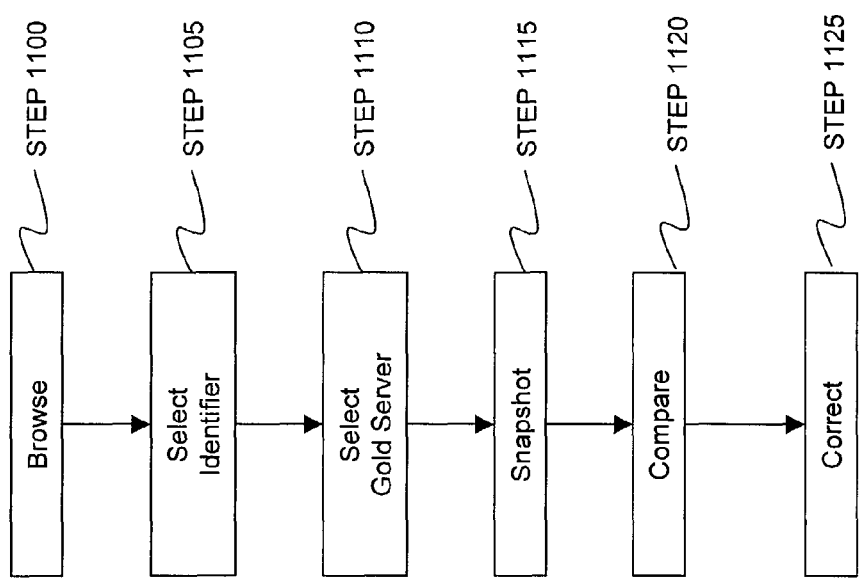
FIG. 11 is a flowchart depicting an embodiment of a method for configuring multiple servers in a heterogeneous computing environment.

FIG. 11 shows an exemplary method of tracking changes and compliance, and correcting component as well as parameter-level changes across multiple servers. In step 1100, the configuration manager 25B browses servers in the network to obtain server asset and configuration (together referred to as server objects) status information for each server. In the browsing step 1100, selected server objects and their dependent server objects are browsed in real time. In one embodiment, live servers in the network and their stored server objects can be browsed via a Graphic User Interface (GUI) which presents the servers and server objects hierarchically.

Next, in step 1105, the configuration manager 25B, selects identifiers of the browsed server objects to be in the template 1010. The identifiers can include any information about the server object that is sufficient to identify the server object.

Next in step 1110, the configuration manager selects a gold server, to provide a baseline configuration and configuration ranges for other servers in the network. In step 1115 snapshots of the values of the server objects identified in the template that are present in the gold server are recorded in the reference model 1030. Based on the values recorded in the reference model 1030, in step 1115, the reference model establishes compliance rules, such as the baseline configuration and the compliance ranges. Alternatively, the snapshots of the values are not recorded in the reference model. Instead, the snapshot results of a server can be used to directly compare against a live-version of this server to track changes.

In step 1120, the configuration manager 25B selects servers and their respective configuration parameters (also referred to as server objects) to compare against the reference model 1030. These servers can be selected from any live servers on the network. Alternatively, these live-version servers can also be directly compared against their own snapshots, taken at an arbitrary point in a time, or taken over a specific period, without the reference model 1030, to track compliance and changes in these servers. The results of the comparing step 1125 can be viewed item-by-item, by showing which software (or server objects) are installed or not installed, or host-by-host, by showing each server and the server objects present on the server.

Finally, based on the discrepancies obtained during the comparing step 1120, a correcting step 1130 fixes the servers to be in compliance by synchronizing configuration of these servers with the reference model 1030 or the snapshots. Moreover, a newly added servers can be provisioned to be consistent with other servers by synchronizing this new server to the reference model 1030.

Figure 12:
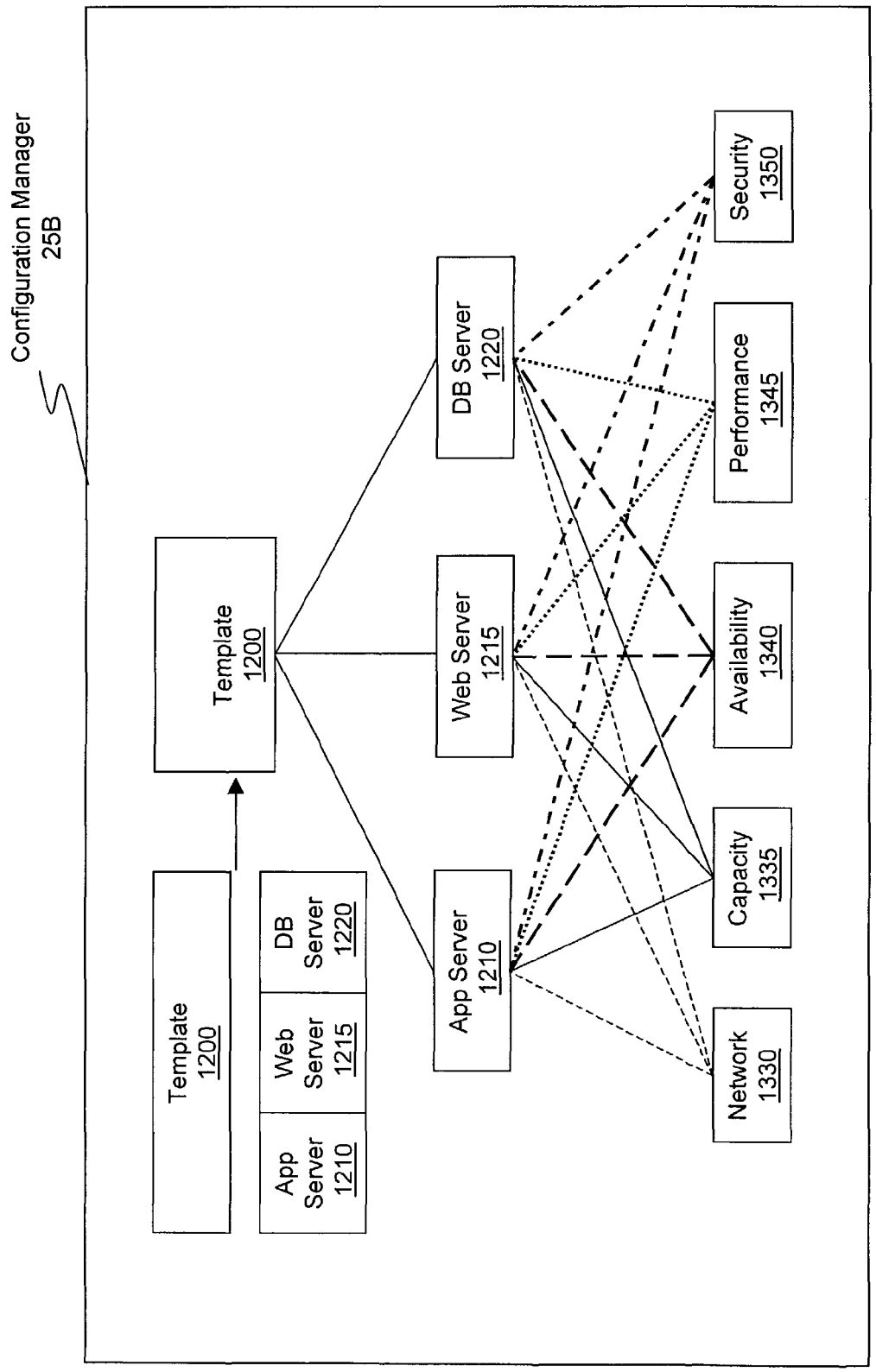
FIG. 12 is a block diagram depicting an embodiment of a system for managing server objects as described in a embodiment of the invention.

Referring to FIG. 12, in one embodiment, the configuration manager 25B can manage the same type of configuration parameters (also referred to as server objects) across different servers by specifying one or more categories for the parameters in templates. The template 1200 first specifies the "server-type" category (e.g., application server category 1210, web server category 1215, and database server category 1220) to specify to what type of server each server object in the network belongs, and then specifies the "parameter-type" category (e.g., network parameters, capacity parameters, availability parameters, performance parameters, security parameters) to specify the parameter type to which each server object belongs. Each server object in the template 1200 can be classified under one or more categories, sub-categories and keywords. In one example, for security parameters, sub-categories can include encryption type and authentication type, and keywords can include "read-only" and constant.

Figure 13:
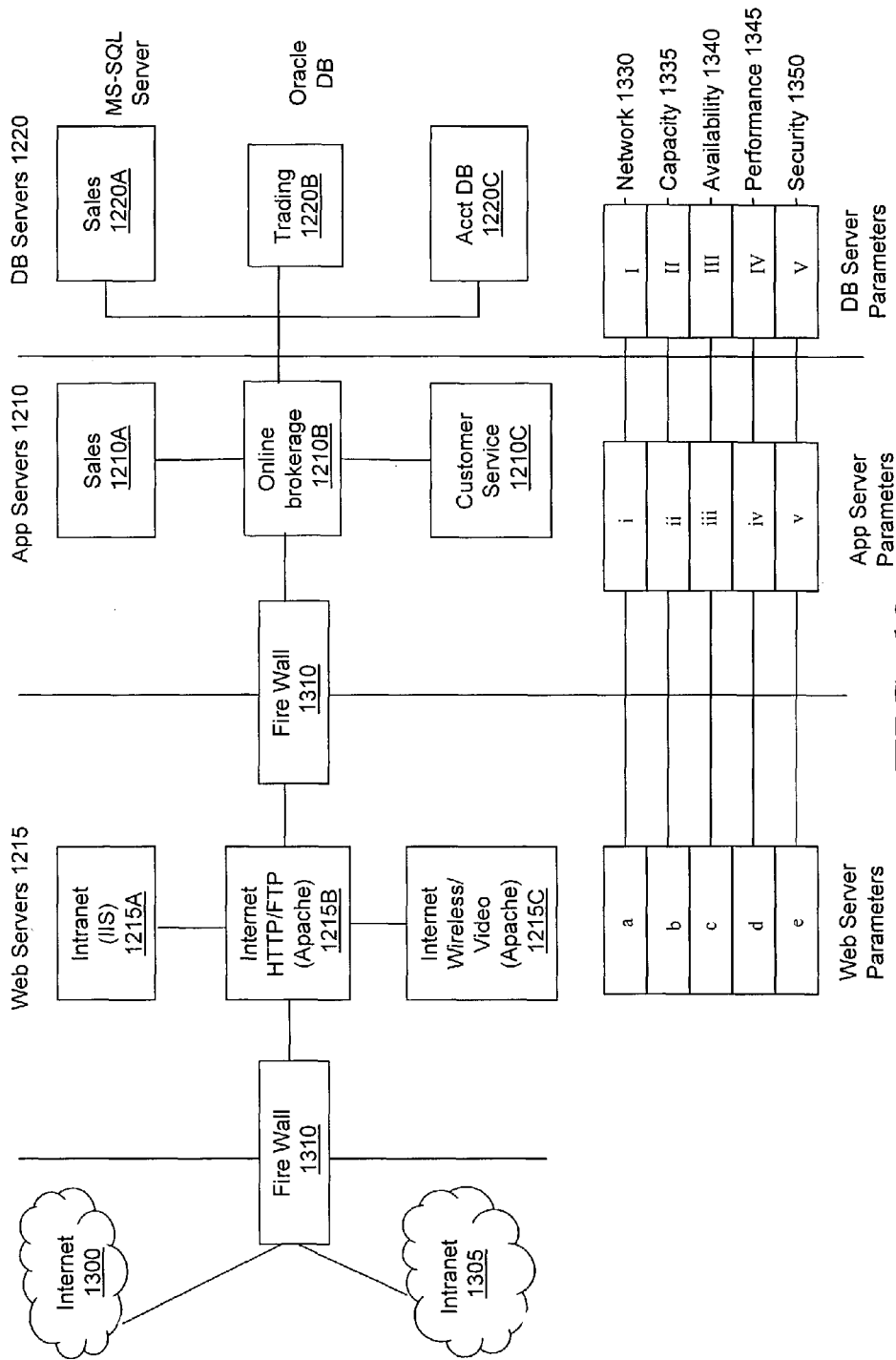
FIG. 13 is a block diagram depicting an exemplary embodiment of the system of FIG. 12.

Referring briefly to FIG. 13, an example of the system described with reference to FIG. 12 is shown. In this example, Internet 1300 and intranet 1305 are available to different categories of servers 1215, 1210, 1220 through firewalls 1310. Web server category 1215 include an IIS server 1215A for intranet services and Apache Servers 1215B, 1215C for the HTTP/FTP and Wireless/Video Internet services respectively. Application server category 1210 include servers running sales applications 1210A, on-line brokerage applications 1210B, and customer service application 1210C. Database server category 1220 include sales, trading, and account databases 1220A, 1220B, and 1220C.

Referring again to FIG. 12, each server object in the template 1200 is placed into a parameter category based on its function and server type. For example, the server objects may be grouped into network parameters 1330, capacity parameters 1335, availability parameters 1340, performance parameters 1345, and security parameters 1350. The configuration manager 25B selects categorically related server objects from each category of servers and stores them in the template 1200. For example, all the security parameters in the application server category 1210 and all the network parameters in the application server category 1210 are stored in the template 1200.

Referring again to FIG. 13, for the web server category 1215, web server configuration parameters a, b, c, d, e are respectively categorized as network parameters 1330, capacity parameters 1335, availability parameters 1340, performance parameters 1345, and security parameters 1350. For the application server category 1210, application server configuration parameters i, ii, iii, iv, v are respectively categorized as network parameters 1330, capacity parameters 1335, availability parameters 1340, performance parameters 1345, and security parameters 1350. Similarly, for the database server category 1220, database server configuration parameters I, II, III, IV, V are respectively categorized as network parameters 1330, capacity parameters 1335, availability parameters 1340, performance parameters 1345, and security parameters 1350.

After categorizing all the server objects in the template 1200 by the server-type categories and the parameter-type categories, a new template can be derived from the template 1200 to isolate the categorically related server objects across the server categories and manage the configuration parameters as if they belonged to a single server. For example, security configuration parameters of an individual web server can be changed in concert with other security configuration parameters for other web servers, as well as for application servers and database servers. In the example shown in FIG. 13, for instance, web server network parameter a can be changed in concert with network parameters i of the application server category 1210 and parameter I of the database server category 1220. Similarly, Web server capacity parameter b can be changed in concert with other capacity parameters ii of the application server category 1210 and II of the database server category 1220. Likewise, correlated changes of parameters can be performed for the availability parameters 1346, the performance parameters 1345, and the security parameters 1350.

Figure 14:
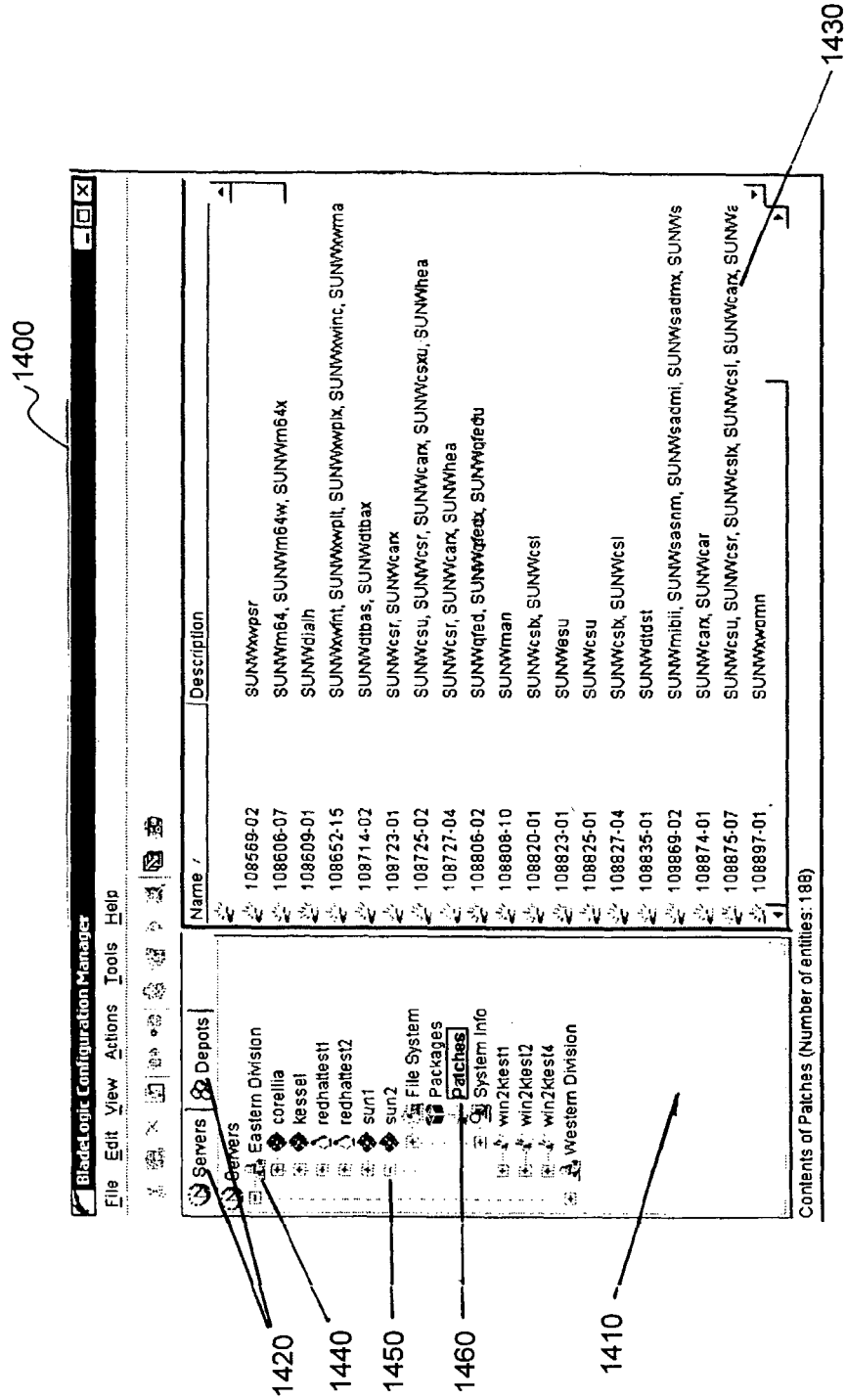
FIG. 14 is a user interface display in an embodiment for a system implementing the method of FIG. 11.

Referring to FIG. 14, an exemplary screenshot of a GUI-based configuration manager 25B includes a module referred to as an asset browser 1400, which allows a user 10 to browse live remote target servers 15, and to manage and store frequently used server assets (also referred to as server objects). The asset browser 1400 is divided into two panes. The left pane 1410 functions as either a Servers pane or a Depots pane, depending on a tab 1420 selected by the user 10. The Contents pane 1430, on the right side displays the contents of an item selected in the Servers or the Depots pane.

In FIG. 14, the left pane 1410 displays the Servers pane which shows a hierarchical depiction of the servers that the user 10 manages. For example, the user 10 may arrange the servers into groups based on geographical location and/or operating system. Server groups are divided into the eastern and western divisions of an enterprise, and within those groups, another level of hierarchy for MICROSOFT WINDOWS, UNIX, and LINUX-based servers. More specifically in FIG. 14, within the servers in the Eastern Division 1440, the patches object 1460 in the "sun-2" server 1450 is selected. The Contents pane 1430 shows the contents of the patches object 1460.

The Depots pane (not shown) can display central repositories of commonly accessed server objects (e.g., all files, software to be deployed, and pointers to the content of the files and software residing in other servers in the network). In additions, the Depots pane stores scheduled tasks to be performed, snapshots of server objects, Shell scripts, and transaction packages 700.

Example

In an overall example of operation of the configuration manage, the configuration manager browses live servers on a network, tracks changes and compliance in the servers by comparing their server objects against a reference model or a snapshot, and identifying any discrepancies from the reference model or the snapshot. By making records of the values of the gold server's server objects through a snapshot and saving the results as a reference model, the reference model may be used to audit other servers, to determine how configurations of the other servers have changed from the reference model. Alternatively, a server's own snapshot can be taken arbitrarily, or over a specific period of time to track changes in the server, without using the reference model. In one example, the server objects being compared in the audit process are provided automatically by the configuration manager via templates. In another example, the user may manually select the server objects to compare. Additionally, the audit process can be scheduled to track compliance over time.

After identifying server configuration discrepancies present in the servers, the configuration manager 25B corrects the discrepancies by generating a transaction package 700, that contains server change operations to be performed on the servers 15. The transaction package 700 bundles configuration changes operations and corresponding instructions to be deployed on remote target servers 15 to correct any discrepancies that exist in server objects contained in those servers 15. With the transaction package 700, the configuration manager 25B can install any types of server objects from a single source to multiple locations. Similarly, the configuration manger 25B can uninstall software, and undo server object deployments on the remote target servers 15. As discussed previously, certain values inside the transaction package 700 can be parameterized and subsequently replaced with real values during the deployment of the transaction package 700 on the target servers 15, without changing the contents of the transaction package 700 for each target server 15.

In one particular example, the configuration manager 25B can be used to move a working MS SQL server database from a gold server to multiple target servers 15, to duplicate the changes made in this database to multiple servers. To achieve this duplication, the user 10 copies the changes made on the SQL Server database to the reference model, so that the configuration manager 25B can later bundle these changes to other instances of the same SQL Server database in the remote target servers 15. The reference model and the remote target servers 15 have the same initial installation of the SQL Server database. The configuration manager takes a snapshot of the gold server to create a reference model that is used as a baseline to compare the SQL Server databases between the gold server and the target servers 15. The necessary database changes are first made to the gold server. Next, the configuration manager 25B creates a transaction package 700 to bundle these changes to be deployed on the target servers 15. The configuration manager 25B deploys the transaction package 700 to the virtual server agents 35 associated with the target servers 15 to request these changes to be made on their SQL Server databases.

In some embodiments, the functionality of the systems and methods described above may be implemented as software on one or more general purpose computers. In such an embodiment, the software may be written in any one of a number of high-level languages, such as FORTRAN, PASCAL, C, C++, LISP, JAVA, or BASIC. Further, the software may be written in a script, macro, or functionality embedded in commercially available software, such as EXCEL or VISUAL BASIC. Additionally, the software could be implemented in an assembly language directed to a microprocessor resident on a computer. For example, the software could be implemented in Intel 80×86 assembly language if it were configured to run on an IBM PC or PC clone. The software may be embedded on an article of manufacture including, but not limited to, a "computer-readable medium" such as a floppy disk, a hard disk, an optical disk, a magnetic tape, a PROM, an EPROM, or CD-ROM.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for receiving and executing, on one of a plurality of servers, a system call from a software application program, the method comprising the steps of:
    (a) providing a representation of a plurality of servers as a single virtual server, the representation of the single virtual server implemented by a virtual server client and a plurality of virtual server agents, at least one virtual server agent running on each one of the plurality of servers;
    (b) receiving, by the virtual server client from a client-side software application program, an abstract system call that requests a service from an operating system of at least one of the plurality of servers, the abstract system call generated by the client-side software application program in response to a command and with indifference to the operating system used by the at least one server; and
    (c) instantiating in a thread-safe manner the abstract system call by:
        identifying, by the virtual server client, a target server to receive the abstract system call and a corresponding virtual server agent associated with the target server;
        transmitting the abstract system call to the identified agent for translation of the abstract system call into an operating system-specific system call for execution on the target server;
        mapping a user identity for a user of the client-side software application program to an associated local user identity for the target server;
        authorizing the abstract system call for the mapped local user identity based on at least one of role-based access control model and an access control list;
        executing the operating system-specific system call using the mapped local user identity on the target server; and
        receiving execution results from the virtual server agent.

2. The method of claim 1, wherein at least two of the plurality of servers have different operating systems.

3. The method of claim 1 further comprising the step of aggregating the abstract system call and a second abstract system call into a high-level abstract system call.

4. The method of claim 3 further comprising the steps of
    (i) receiving, by the virtual server client, the high-level abstract system call;
    (ii) disintegrating, by the virtual server client, the high-level abstract system call into the abstract system call and the second abstract system call; and
    (iii) instantiating in a thread-safe manner each of the abstract system call and the second abstract system call.

5. The method of claim 3 further comprising the steps of:
    (i) receiving, by the virtual server client, the high-level abstract system call; and
    (ii) instantiating in a thread-safe manner the high-level abstract system call.

6. The method of claim 1, wherein the virtual server client is implemented by a network-aware code library.

7. The method of claim 6, wherein the network-aware code comprises a network-aware version of a libc library.

8. The method of claim 6, wherein the virtual server client comprises a network-aware version of a libc library.

9. The method of claim 1 wherein the identifying step comprises identifying the target virtual server agent to receive the abstract system call in response to a server identifier included in the abstract system call.

10. The method of claim 9, wherein the server identifier comprises a host name specified in a path.

11. The method of claim 9, wherein the server identifier comprises a network address.

12. The method of claim 11, wherein the server identifier is inferred from a group of servers the target server belongs to.

13. The method of claim 1 further comprising, after the transmitting step, the steps of:
    (i) translating, by the virtual server agent, the abstract system call into operating system specific system call to be executed by the target server; and
    (ii) executing, by the target server, the operating system specific system call in a thread-safe manner.

14. The method of claim 1 further comprising: before the transmitting step, specifying at least one of priority, CPU utilization, and memory utilization of the abstract system call on the target server associated with the identified virtual server agent.

15. The method of claim 1 further comprising:
    (i) authenticating the user of the client-side software application program and a management system operating the client-side software application program;
    (ii) encrypting, by the virtual server client, the abstract system call;
    (iii) identifying, by the virtual server agent, the management system and the user;
    (iv) decrypting, by the virtual server agent, the encrypted abstract system call; and
    (v) maintaining an audit log to record the name of the user and the abstract system call executed on the target server.

16. The method of claim 15, wherein the authenticating step (i) is performed in accordance with a public key protocol.

17. The method of claim 15, wherein the authenticating step and the encrypting step are performed in accordance with Kerberos protocol.

18. The method of claim 15, wherein the authenticating step and the encrypting step are performed in accordance with Shared Secret protocol.

19. The method of claim 1 further comprising:
    modifying an existing non-distributed application to function as a network-aware application by substituting a non network-aware system call with the abstract system call.

20. The method of claim 19, wherein the modifying step comprises modifying a non-distributed Unix shell to function as the network-aware application program.

21. The method of claim 19, wherein the modifying step comprises modifying a non-distributed scripting language to function as the network aware-application program.

22. The method of claim 21, wherein the non-distributive scripting language comprises Perl.

23. The method of claim 21, wherein the non-distributive scripting language comprises Python.

24. The method of claim 1, wherein the client-side software application program comprises a configuration manager.

25. A virtual server, having a virtual server client and a virtual server agent, for representing a plurality of servers as an abstract model, wherein the virtual server comprises:
  (a) a virtual server client receiver for receiving, from a client-side software application program, an abstract system call that requests a service from an operating system of at least one of the plurality of servers, the abstract system call generated by the client-side software application program in response to command and with indifference to the operating system used by the at least one server;
  (b) a virtual server client instantiator, in communication with the virtual server client receiver, for instantiating the abstract system call in a thread-safe manner;
  (c) a virtual server client transmitter, in communication with the virtual server client instantiator, for transmitting the abstract system call;
  (d) a virtual server agent receiver for receiving the abstract system call from the virtual server client transmitter;
  (e) a virtual server agent translator for translating the abstract system call to an operating system specific system call;
  (f) a virtual server agent mapper for mapping a user identity for a user of the client-side software application program to an associated local user identity for a target server;
  (g) a virtual server agent authorizer for authorizing the abstract system call for the mapped local user identity based on at least one of a role-based access control model and an access control list;
  (h) a virtual server agent impersonator for impersonating the user of the client-side software application program using the mapped local user identity on the target server; and
  (i) a target server executor for executing the operating system specific system call on the target server associated with the virtual server agent in a thread-safe manner.

26. The virtual server of claim 25, wherein at least two of the plurality of servers have different operating systems.

27. The virtual server of claim 25 further comprising an aggregator for aggregating the abstract system call and a second abstract system call into a high-level abstract system call.

28. The virtual server of claim 27, wherein the virtual server client receiver receives the high-level abstract system call and disintegrates the high-level abstract system call into the abstract system call and the second abstract system call and the virtual server client instantiator instantiates in a thread-safe manner the abstract system call and the second abstract system call.

29. The virtual server of claim 27, wherein the virtual server client receiver receives the high-level abstract system call, and the virtual server client instantiator instantiates the high-level abstract system call in a thread-safe manner.

30. The virtual server of claim 25, wherein the virtual server client is implemented by a network-aware code library.

31. The virtual server of claim 30, wherein the network-aware code library comprises a network aware version of a libc library.

32. The virtual server of claim 30, wherein the virtual server client comprises a network-aware version of a libc library.

33. The virtual server of claim 25, wherein the virtual server client instantiator identifies the target virtual server agent to receive the abstract system call in response to a server identifier included in the abstract system call.

34. The virtual server of claim 33, wherein the server identifier comprises a host name specified in a path.

35. The virtual server of claim 33, wherein the server identifier comprises a network address.

36. The virtual server of claim 35, wherein the server identifier is inferred from a group of servers the target server belongs to.

37. The virtual server of claim 25, wherein the virtual server client transmitter specifies at least one of priority, CPU utilization, and memory utilization of the abstract system call on the target server-s associated with the virtual server agent-s.

38. The virtual server of claim 25 further comprising:
  (i) an authenticator for authenticating the user of the client-side software application program and a management system operating the client-side software application program;
  (ii) a virtual server client encryptor for encrypting the abstract system call;
  (iii) a virtual server agent identifier for identifying the management system and the user;
  (iv) a virtual server agent decryptor for decrypting the encrypted abstract system call; and
  (v) an audit log for recording the name of the user and the abstract system call executed on the target server.

39. The virtual server of claim 38, wherein the virtual server client encryptor performs in accordance with a public key protocol.

40. The virtual server of claim 38, wherein the authenticator and the virtual server client encryptor perform in accordance with a Kerberos protocol.

41. The virtual server of claim 38, wherein the authenticator and the virtual server client encryptor perform in accordance with a Shared Secret protocol.

42. The virtual server of claim 25, wherein the virtual server modifies an existing non-distributed application to function as a network-aware application by substituting a non network-aware system call with the abstract system call.

43. The virtual server of claim 42, wherein the virtual server further modifies a non-distributed Unix shell to function as the network-aware application program.

44. The virtual server of claim 42, wherein the virtual server further modifies a non-distributed scripting language to function as the network aware-application program.

45. The virtual server of claim 44, wherein the non-distributed scripting language comprises Perl.

46. The virtual server of claim 44, wherein the non-distributed scripting language comprises Python.

47. The virtual server of claim 25, wherein the client-side software application program comprises a configuration manager.

48. A method for securely executing a system call on a remote computer, the method comprising the steps of:
  (a) receiving, by a virtual server client running on a client computer from an software application program running on the client computer and operated by an authenticated user, an abstract system call that requests a service from an operating system of at least one remote computer, the abstract system call generated by the client-side software application program in response to a command and with indifference to the operating system used by the at least one remote computer;
(b) instantiating in a thread-safe manner the abstract system call by:
identifying, by the virtual server client, a virtual server agent running on a target remote computer to receive the abstract system call;
(c) encrypting, by the virtual server client, the abstract system call;
(d) communicating the encrypted abstract system call to the virtual server agent;
(e) identifying, by the virtual server agent, the client computer and the authenticated user;
(f) decrypting, by the virtual server agent, the encrypted abstract system call;
(g) mapping the authenticated user to a local user on the target remote computer;
(h) impersonating the authenticated user as the local user on the target remote computer;
(i) authorizing the decrypted abstract system call for the local user based on at least one of role-based access control model and access control lists;
(j) translating the abstract system call to an operating system specific system call; and
(k) executing as the local user, by the virtual server agent, the operating system specific system call on the target remote computer.

49. The method of claim 48 further comprising:
before the receiving step (a), authenticating a user in accordance with a public key protocol.

50. The method of claim 48 further comprising: before the receiving step (a), authenticating a user in accordance with a Kerberos protocol.

51. The method of claim 48 further comprising, if the authenticated user is not identified as a local user in the identifying step (e), then designating the authenticated user as a local guest.

52. The method of claim 48, wherein the authorizing step (i) comprises authorizing the decrypted abstract system call for the local user based on at least one of roll-based access control model and access control lists in accordance with Kerberos protocol.

53. The method of claim 48, wherein the authorizing step (i) comprises authorizing the decrypted abstract system call for the local user based on at least one of roll-based access control model and access control lists in accordance with SSL protocol.

54. The method of claim 48 further comprising:
after the executing step (k)
encrypting results of the executing step (k); and
returning the encrypted results to the virtual server client.

55. The method of claim 48, further comprising:
maintaining an audit log, by the virtual server client and the identified virtual server agent, that includes names of the authenticated user and the abstract system call performed.

56. A virtual server for securely executing a system call on a remote computer, the virtual server comprising:
(a) a virtual server client receiver running on a client computer for receiving, from a software application program running on the client computer and operated by an authenticated user, an abstract system call that requests a service from an operating system of at least one remote computer, the abstract system call generated by the client-side software application program in response to a command and with indifference to the operating system used by the at least one remote computer;
(b) a virtual client instantiator, in communication with the virtual server client receiver, for instantiating the abstract system call in a thread-safe manner by identifying a virtual server agent running on a target remote computer to receive the abstract system call;
(c) a virtual server client encryptor, in communication with the virtual server client instantiator, for encrypting the abstract system call;
(d) a virtual server client transmitter for communicating the encrypted abstract system call to the virtual server agent;
(e) a virtual server agent decryptor, in communication with the virtual server client transmitter, for decrypting the encrypted abstract system call;
(f) a virtual server agent identifier, in communication with a virtual server agent decryptor, for identifying the authenticated user and the client computer;
(g) a virtual server agent mapper, in communication with the identifier and the decryptor, for mapping the authenticated user to a local user on the target remote computer;
(h) a virtual server agent impersonator for impersonating the authenticated user as the local user on the target remote computer;
(i) a virtual server agent authorizer, in communication with the virtual server agent impersonator, for authorizing the decrypted abstract system call for the local user based on at least one of role-based access control model and access control lists;
(j) a virtual server agent translator for translating the abstract system call to an operating system specific system call; and
(k) a virtual server agent executor, in communication with the virtual server agent authorizer, for executing the operating system specific system call as the local user on the target remote computer.

57. The virtual server of claim 56, wherein, if the authenticated user is not identified as a local user by the virtual server agent identifier, then the virtual server agent identifier designates the authenticated user as a local guest.

58. The virtual server of claim 56, wherein the virtual server agent authorizer performs in accordance with Kerberos protocol.

59. The virtual server of claim 56, wherein the virtual server agent authorizer performs in accordance with SSL protocol.

60. The virtual server of claim 56, wherein the virtual server agent executor encrypts results of executing the operating system specific system call, and returns the encrypted results to the virtual server client.

61. The virtual server of claim 56, further comprising:
an audit log, maintained by the virtual server client and the identified virtual server agents, that includes names of the authenticated user and the abstract system call performed.

* * * * *

UNITED STATES PATENT AND TRADEMARK OFFICE
CERTIFICATE OF CORRECTION

PATENT NO. : 8,447,963 B2
APPLICATION NO. : 10/414959
DATED : May 21, 2013
INVENTOR(S) : Thomas Martin Kraus et al.

Page 1 of 1

It is certified that error appears in the above-identified patent and that said Letters Patent is hereby corrected as shown below:

On Title page 4, in column 2, under "Other Publications", line 50, delete "Protocal" and insert --Protocol--, therefor.

On Title page 5, in column 2, under "Other Publications", line 7, delete "Archetchture" and insert --Architecture--, therefor.

On Title page 5, in column 2, under "Other Publications", line 11, delete "Lunux" and insert --Linux--, therefor.

In the Specification
In column 1, line 11, delete "(Ser." and insert --Ser.--, therefor.

In the Claims
In column 29, line 55, in claim 28, delete "second abstract system call" and insert --second abstract system call,--, therefor.
In column 29, line 66, in claim 31, delete "network aware" and insert --network-aware--, therefor.
In column 30, line 19, in claim 37, delete "server-s" and insert --server--, therefor.
In column 30, lines 19-20, in claim 37, delete "agent-s." and insert --agent.--, therefor.
In column 30, line 63, in claim 48, after "from" delete "an software" and insert --a software--, therefor.
In column 31, line 50, in claim 54, delete "(k)" and insert --(k),--, therefor.
In column 32, line 59, in claim 61, delete "agents," and insert --agent,--, therefor.

Signed and Sealed this
Twentieth Day of August, 2013

Teresa Stanek Rea
*Acting Director of the United States Patent and Trademark Office*